United States Patent
Suzuki

(10) Patent No.: US 8,194,140 B2
(45) Date of Patent: Jun. 5, 2012

(54) IMAGE PICKUP APPARATUS FOR PERFORMING A DESIRABLE SELF TIMER SHOOTING AND AN AUTOMATIC SHOOTING METHOD USING THE SAME

(75) Inventor: Masatoshi Suzuki, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 848 days.

(21) Appl. No.: 12/211,520

(22) Filed: Sep. 16, 2008

(65) Prior Publication Data

US 2009/0079844 A1 Mar. 26, 2009

(30) Foreign Application Priority Data

Sep. 25, 2007 (JP) ................................. 2007-247650

(51) Int. Cl.
*G03B 17/40* (2006.01)
*H04N 5/235* (2006.01)
(52) U.S. Cl. .................. 348/208.16; 348/349; 348/363; 339/52; 339/264
(58) Field of Classification Search .................. 348/349, 348/363, 208.16, 352; 396/52, 54, 264
See application file for complete search history.

(56) References Cited

U.S. PATENT DOCUMENTS

| | | | |
|---|---|---|---|
| 7,623,678 B2 | 11/2009 | Masaki | |
| 7,848,633 B2* | 12/2010 | Sugimoto | 396/264 |
| 7,916,182 B2* | 3/2011 | Itoh | 348/222.1 |
| 7,936,384 B2* | 5/2011 | Sawachi | 348/240.1 |
| 8,068,639 B2* | 11/2011 | Ishiwata et al. | 382/103 |
| 2006/0197845 A1* | 9/2006 | Masaki | 348/224.1 |
| 2007/0237513 A1* | 10/2007 | Sugimoto et al. | 396/123 |
| 2009/0109292 A1* | 4/2009 | Ennis | 348/158 |

FOREIGN PATENT DOCUMENTS

| | | | |
|---|---|---|---|
| JP | 4-360138 A | 12/1992 |
| JP | 6-51188 | 2/1994 |
| JP | 6-202222 A | 7/1994 |
| JP | 11-142725 A | 5/1999 |
| JP | 2006-237961 A | 9/2006 |
| JP | 2006-254358 A | 9/2006 |
| JP | 2007-166187 A | 6/2007 |
| JP | 2008-256878 A | 10/2008 |

* cited by examiner

*Primary Examiner* — Clayton E Laballe
*Assistant Examiner* — Leon W Rhodes, Jr.
(74) *Attorney, Agent, or Firm* — Birch, Stewart, Kolasch & Birch, LLP

(57) ABSTRACT

An image pickup apparatus includes a system controller and a face detector, and can register face data of a photographer for a self-timer shooting mode in advance. In the self-timer shooting mode, the face detector extracts face data of people in a subject field from an image signal. When the system controller determines, on the basis of the extracted face data and the registered face data, that the photographer can be detected, the apparatus starts countdown for automatic shooting. Consequently, the apparatus can pick up an image of the photographer without fail, and the photographer can securely strike a pose within the countdown period of time. Furthermore, the apparatus can determine the countdown period of time optionally, thereby enabling the self-timer shooting to be executed depending on the personality of the photographer.

18 Claims, 15 Drawing Sheets

FIG. 3A
FIG. 3B
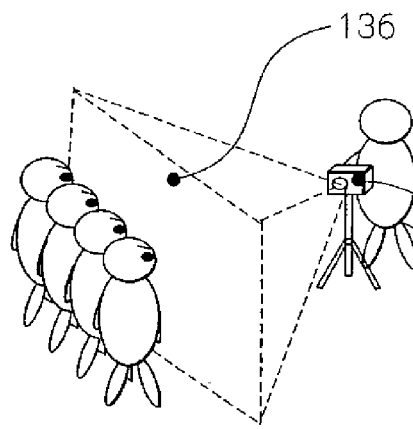
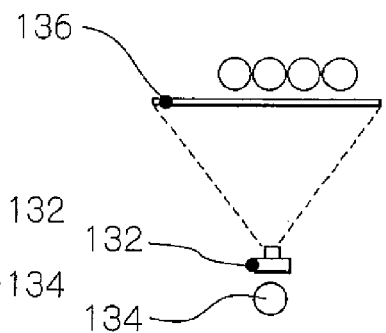
FIG. 4A
FIG. 4B
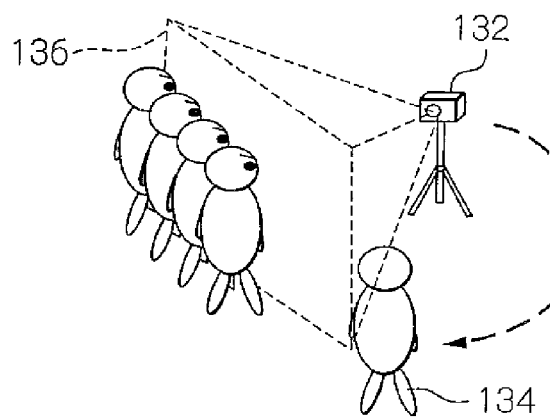
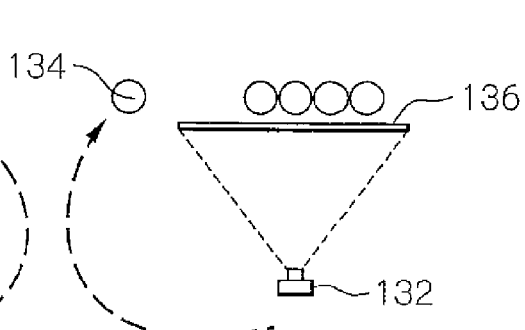
FIG. 5A
FIG. 5B
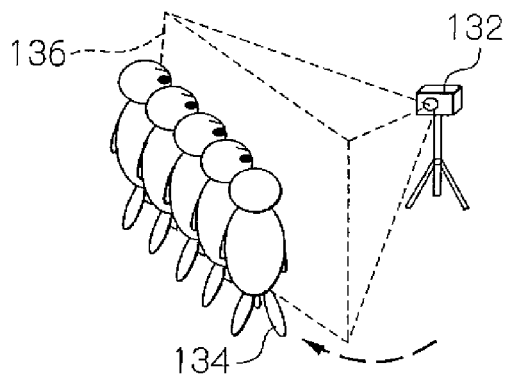
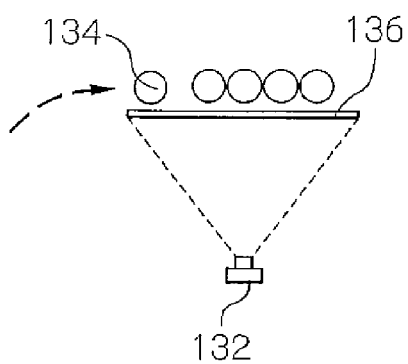

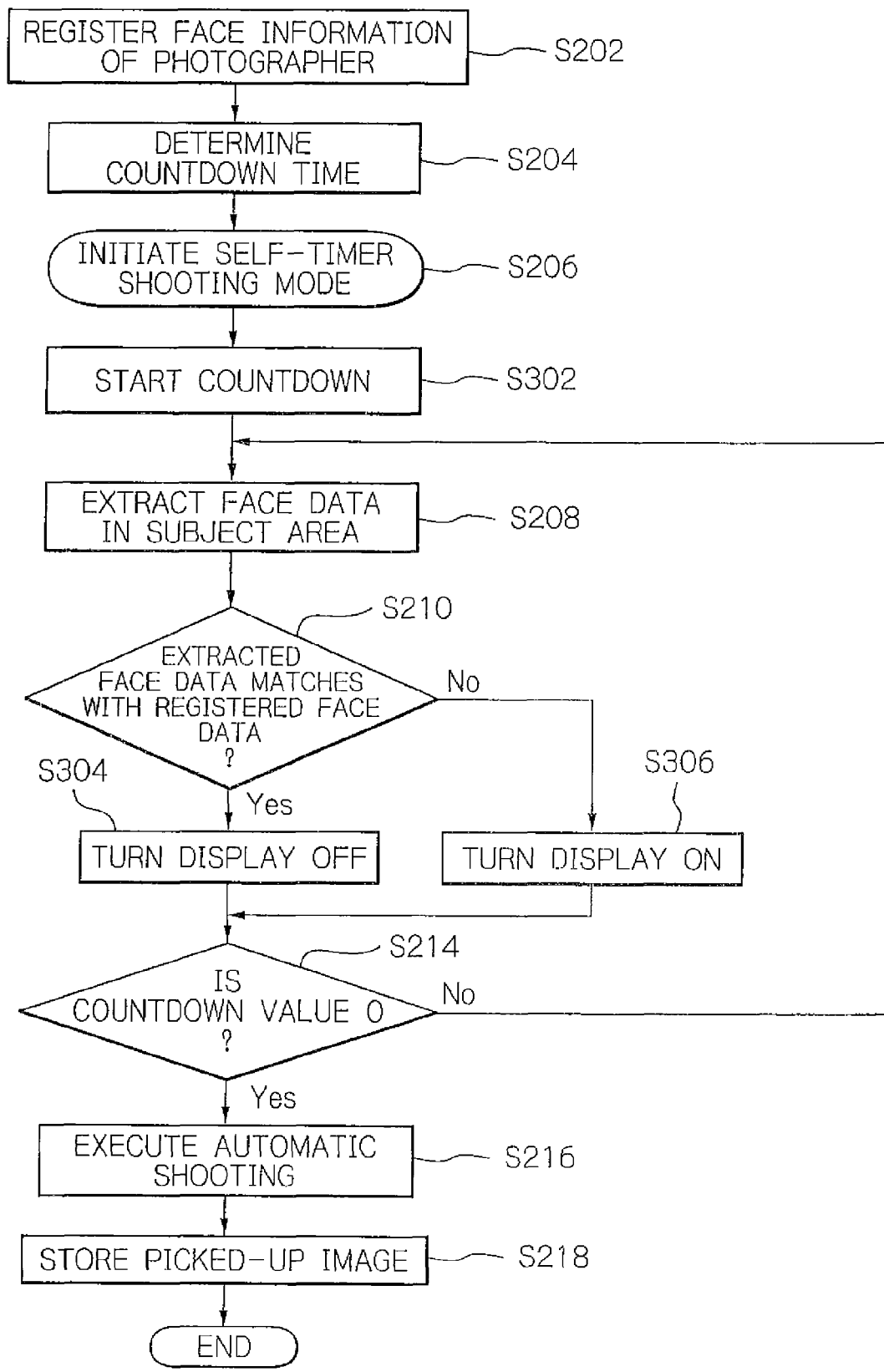

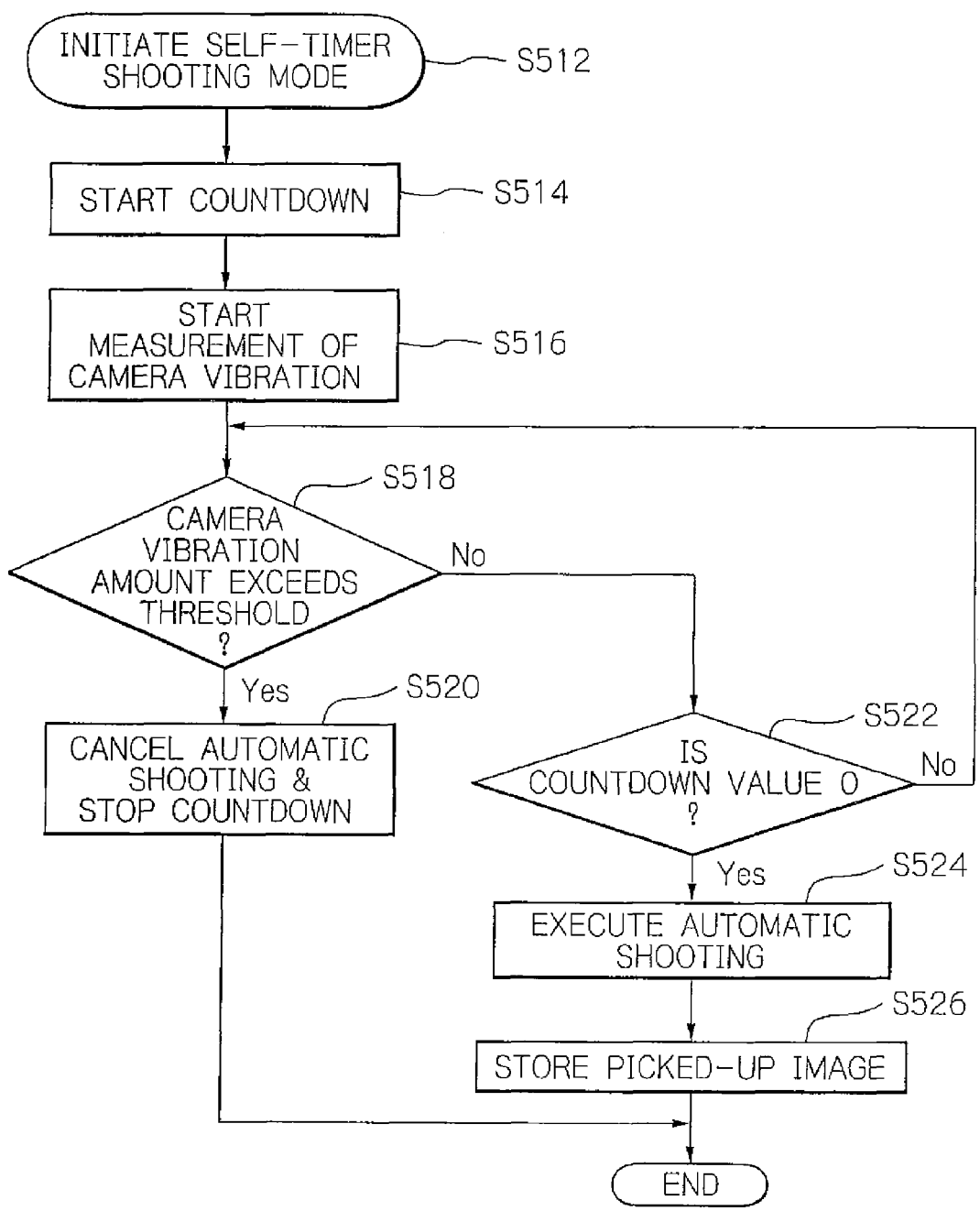

IMAGE PICKUP APPARATUS FOR PERFORMING A DESIRABLE SELF TIMER SHOOTING AND AN AUTOMATIC SHOOTING METHOD USING THE SAME

BACKGROUND OF THE INVENTION

1. Field of the Invention

The present invention relates to an image pickup apparatus for automatically taking an image in a self-timer mode and an automatic shooting method using the same.

2. Description of the Background Art

Some of conventional image pickup apparatuses perform a self-timer shooting so that the apparatuses automatically pick up an image of a subject field after a certain countdown period of time has elapsed since an operator depressed a shutter release key of the apparatus.

For example, Japanese patent laid-open publication No. 51188/1994 discloses an automatic focusing camera designed to perform a self-timer shooting in such a manner that before the activation of the self-timer mode, automatic focus (AF) distance measurement and AF calculation are conducted and a lens of camera is driven under the AF control so as to bring the lens in its in-focus condition, and after the passage of the self-timer period, the AF distance measurement is carried out again to obtain a focal difference from the last focus position for determining whether or not the focal difference is larger than a predetermined value. When the focal difference is less than or equal to the predetermined value, the shutter of the camera is released to pick up an image. Otherwise, it is determined that the camera is not in the appropriate condition for shooting due to, e.g. the presence of an obstacle between the camera and the subject, so that an alarm is given to inform the presence of the obstacle and the shutter release operation is cancelled. Consequently, even if an obstruction exists between the camera and the subject during the shutter release operation, an undesired image will not be taken.

Another Japanese patent laid-open publication No. 360138/1992 discloses a camera, in which shutter release determination means determines whether a shutter is released by an internal operation or by means of an incoming release signal, and on the basis of the determination result, switching means selects a low power consumption mode only when the shutter release is performed in response to the incoming release signal. Thus, wasteful battery consumption can be restrained during the release operation by the incoming release signal.

In such self-timer shooting, a photographer, who is also a person to be photographed, preferably stays and waits in an area to be photographed and strikes the best pose to a camera within a countdown period of time of the timer. The conventional image pickup apparatuses may, however, execute the automatic shooting before the photographer gets ready for being shot or he/she can hold his/her best pose, so that an intended image cannot be taken.

Furthermore, even when the cameras themselves move during the self-timer shooting mode or the photographer notices an error in camera setting, the camera may proceed to automatic shooting, thus resulting in the waste of its battery power.

In addition, when the conventional cameras execute the automatic shooting in response to an external signal fed by a remote control, the cameras can turn off their display upon receipt of the external signal to reduce the power consumption. However, once the display is turned off by the external signal, the photographer, when wanting to reconfirm the display, cannot confirm the display any more.

SUMMARY OF THE INVENTION

It is an object of the present invention to provide an image pickup apparatus and an automatic shooting method using the apparatus to execute an automatic shooting depending on the shooting conditions in a self-timer mode without wasting electrical power.

In accordance with the present invention, an image pickup apparatus, having an image sensor for receiving light incident from a subject field through an optics to form an image with a plurality of pixels and electrically converting the image to a corresponding signal charge to thereby generate an image signal, includes a face detector for extracting face data of a person in the subject field on the basis of the image signal in a self-timer shooting; a face examination section for comparing the extracted face data detected in the face detector with face data of a person registered beforehand, and using a comparison result to examine whether or not the registered person is detected; a countdown section for executing, if the face examination section determines that the registered person is detected, countdown starting from a predetermined reference countdown period of time; and a shooting controller for controlling the image sensor to execute an automatic shooting when the countdown is completed by the countdown section.

An image pickup apparatus of the present invention, having an image sensor for receiving light incident from a subject field through an optics to form an image with a plurality of pixels and electrically converting the image to a corresponding signal charge to thereby generate an image signal, includes a face detector for extracting face data of a person in the subject field on the basis of the image signal in a self-timer shooting; a face examination section for comparing the extracted face data detected in the face detector with face data of a person registered beforehand, and using a comparison result to examine whether or not the registered person is detected; a countdown section for executing, if the face examination section determines that the registered person is detected, countdown starting from a predetermined reference countdown period of time; and a shooting controller for controlling the image sensor to execute an automatic shooting when the countdown is completed by the countdown section. Furthermore, the image pickup apparatus includes a face blur amount detector for using the extracted face data detected in the face detector, when the face examination section determines that the registered person is detected, to thereby detect a blur amount of a face image of the registered person; and, a registered person readiness determining section for comparing the face blur amount detected in the face blur amount detector with a predetermined threshold value to determine on the basis of the comparison result whether or not the registered person is in readiness in a shooting area. The registered person readiness determining section determines an updating time by using, if the face blur amount becomes less than or equal to the threshold before the end of the countdown by the countdown section, a time that elapses until the blur amount becomes less than or equal to the threshold after the start of the countdown; and otherwise by adding the reference countdown period of time to the predetermined additional time, thereby using the updating time to define a renewed countdown period of time and set it as the reference countdown period of time.

Furthermore, an image pickup apparatus of the present invention, having an image sensor for receiving light incident from a subject field through an optics to form an image with a plurality of pixels and electrically converting the image to a corresponding signal charge to generate an image signal, includes a face detector for extracting face data of a person in the subject field on the basis of the image signal in a self-timer shooting; a face examination section for comparing the extracted face data detected in the face detector with face data of a person registered beforehand, and using a comparison result to examine whether or not the registered person is detected; a countdown section for executing, if the face examination section determines that the registered person is detected, countdown starting from a predetermined reference countdown period of time; and a shooting controller for controlling the image sensor to execute an automatic shooting when the countdown is completed by the countdown section. When the face examination section determines that the registered person is not detected after the face examination section once has determined that the registered person has been detected, the apparatus measures an elapsed time from the undetecting point of the registered person, and then determines, when the elapsed time passes a predetermined permissible time of face-missing, that the face of the registered person is out of a frame of the image, thereby canceling the self-timer shooting.

An image pickup apparatus of the present invention, having an image sensor for receiving light incident from a subject field through an optics to form an image with a plurality of pixels and electrically converting the image to a corresponding signal charge to generate an image signal, and a display for visibly displaying the image of the subject field on the basis of the image signal, includes a face detector for extracting face data of a person in the subject field on the basis of the image signal in a self-timer shooting; and a face examination section for comparing the extracted face data detected in the face detector with face data of a person registered beforehand, and using a comparison result to examine whether or not the registered person is detected. The apparatus turns off the display when the face examination section determines that the registered person is detected, and turns on the display when the face examination section determines that the registered person is undetected.

An image pickup apparatus of the present invention, having an image sensor for receiving light incident from a subject field through an optics to form an image with a plurality of pixels and electrically converting the image to a corresponding signal charge to generate an image signal, includes a countdown section for executing in a self-timer shooting mode countdown starting from a predetermined reference countdown period of time; and a shooting controller for controlling the image sensor to execute an automatic shooting when the countdown is completed by the countdown section. The apparatus further includes a subject distance detector for detecting a subject distance between the apparatus and a subject position in the self-timer shooting. The apparatus uses an average moving speed of man and the subject distance to calculate traveling time for a person to be photographed to move from the apparatus to the subject position, and, on the basis of the traveling time, defines a countdown period of time to determine it as the reference countdown period of time.

In addition, an image pickup apparatus of the present invention, having an image sensor for receiving light incident from a subject field through an optics to form an image with a plurality of pixels and electrically converting the image to a corresponding signal charge to generate an image signal, includes a countdown section for executing in a self-timer shooting mode countdown starting from a predetermined reference countdown period of time; and a shooting controller for controlling the image sensor to execute an automatic shooting when the countdown is completed by the countdown section. The apparatus further includes an apparatus vibration amount sensor for detecting an apparatus vibration amount of the apparatus; and an angle-of-view shift determining section for comparing the apparatus vibration amount with a predetermined threshold value, and determining, in response to the comparison result, a shift in an angle-of-view occurring in the course of the self-timer shooting. The angle-of-view shift determining section cancels the self-timer shooting if the apparatus vibration amount exceeds the threshold value.

Also, in accordance with the present invention, an automatic shooting method using an image pickup apparatus, which has an image sensor for receiving light incident from a subject field through an optics to form an image with a plurality of pixels and electrically converting the image to a corresponding signal charge to generate an image signal, includes a face detection step of extracting face data of a person in the subject field on the basis of the image signal in a self-timer shooting; a face examination step of comparing the extracted face data detected in the face detection step with face data of a person registered beforehand, and using a comparison result to examine whether or not the registered person is detected; a countdown step of executing, if the registered person is determined as being detected in the face examination step, countdown starting from a predetermined reference countdown period of time; and an automatic shooting step of controlling the image sensor to execute an automatic shooting when the countdown is completed in the countdown step.

An automatic shooting method of the present invention using an image pickup apparatus, which has an image sensor for receiving light incident from a subject field through an optics to form an image with a plurality of pixels and electrically converting the image to a corresponding signal charge to generate an image signal, includes a face detection step of extracting face data of a person in the subject field on the basis of the image signal in a self-timer shooting; a face examination step of comparing the extracted face data detected in the face detection step with face data of a person registered beforehand, and using a comparison result to examine whether or not the registered person is detected; a countdown step of executing, if the registered person is determined as being detected in the face examination step, countdown starting from a predetermined reference countdown period of time; and an automatic shooting step of controlling the image sensor to execute an automatic shooting when the countdown is completed in the countdown step. The method further includes a face blur amount detection step of using the extracted face data detected in the face detection step to detect, when the registered person is determined as being detected in the face examination step, a blur amount of a face image of the registered person; and a registered person readiness determination step of comparing the face blur amount detected in the face blur amount detection step with a predetermined threshold value to determine on the basis of the comparison result whether or not the registered person is in readiness in a shooting area. The registered person readiness determination step determines an updating time by using, if the face blur amount becomes less than or equal to the threshold value before the end of the countdown in the countdown step, a time that elapsed until the blur amount becomes less than or equal to the threshold after the start of the countdown; and otherwise by adding the reference countdown period of time to the predetermined additional time, thereby using the updating time to define a renewed countdown period of time to determine it as the reference countdown period of time.

Furthermore, an automatic shooting method using an image pickup apparatus, which has an image sensor for receiving light incident from a subject field through an optics to form an image with a plurality of pixels and electrically converting the image to a corresponding signal charge to generate an image signal, includes a face detection step of extracting face data of a person in the subject field on the basis of the image signal in a self-timer shooting; a face examination step of comparing the extracted face data detected in the face detection step with face data of a person registered beforehand, and using a comparison result to examine whether or not the registered person is detected; a countdown step of executing, if the registered person is determined as being detected in the face examination step, countdown starting from a predetermined reference countdown period of time; and an automatic shooting step of controlling the image sensor to execute an automatic shooting when the countdown is completed in the countdown step. When the registered person is determined as being undetectable in the face examination step after the registered person once has been determined as being detected in the face examination step, the method measures elapsed time from the undetecting point of the registered person, and then determines, when the elapsed time passes a predetermined permissible time of face-missing, the face of the registered person is out of a frame of image, thereby canceling the self-timer shooting.

An automatic shooting method using an image pickup apparatus, which has an image sensor for receiving light incident from a subject field through an optics to form an image with a plurality of pixels and electrically converting the image to a corresponding signal charge to generate an image signal and a display for visibly displaying the image of the subject field on the basis of the image signal, includes a face detection step of extracting face data of a person in the subject field on the basis of the image signal in a self-timer shooting; and a face examination step of comparing the extracted face data detected in the face detection step with face data of a person registered beforehand, and using a comparison result to examine whether or not the registered person is detected. The method turns off the display when the registered person is determined as being detected in the face determination step, and turns on the display when the registered person is determined as being undetectable.

An automatic shooting method using an image pickup apparatus, which has an image sensor for receiving light incident from a subject field through an optics to form an image with a plurality of pixels and electrically converting the image to a corresponding signal charge to thereby generate an image signal, includes a countdown step of executing, in a self-timer shooting mode, countdown starting from a predetermined reference countdown period of time; and an automatic shooting step of controlling the image sensor to execute an automatic shooting when the countdown is completed in the countdown step. The method further includes a subject distance detection step of detecting a subject distance between the image pickup apparatus and a subject position in the self-timer shooting. The method uses an average moving speed of man and the subject distance for calculating traveling time for a person to be photographed to move from the apparatus to the subject position, and defines, on the basis of the traveling time, a countdown period of time to determine it as the reference countdown period of time.

In addition, an automatic shooting method using an image pickup apparatus, which has an image sensor for receiving light incident from a subject field through an optics to form an image with a plurality of pixels and electrically converting the image to a corresponding signal charge to generate an image signal, includes a countdown step of executing, in a self-timer shooting mode, countdown starting from a predetermined reference countdown period of time; and an automatic shooting step of controlling the image sensor to execute an automatic shooting when the countdown is completed in the countdown step. The method further includes an apparatus vibration amount detection step of detecting an apparatus vibration amount of the apparatus itself; and an angle-of-view shift determination step of comparing the apparatus vibration amount with a predetermined threshold value, and determining, in response to the comparison result, a shift in an angle-of-view occurring in the course of the self-timer shooting. The angle-of-view shift determination step cancels the self-timer shooting if the apparatus vibration amount exceeds the threshold value.

According to the image pickup apparatus of the present invention, face data of a person is registered in advance, and the face detector extracts face data of the a person in the subject field from an image signal in the self-timer shooting mode. When the system controller of the apparatus can detect the registered person on the basis of the extracted face data and the registered face data, it starts the countdown of the timer. Thus, the image pickup apparatus can pick up the image of the subject containing the registered person without fail, and the registered person can strike a pose well within the countdown period of time. Moreover, in the apparatus, the countdown period of time can be set optionally, thereby enabling the self-timer shooting depending on the personality of the registered person to be executed.

The image pickup apparatus performs further AE and AF adjustments, when the photographer image is detected from the subject image, preferably after the countdown of the self-timer is completed, thereby enabling an automatic shooting under proper AE and AF control to be executed even where the AE and AF settings change from those in the beginning of the self-timer shooting. Consequently, the precision of the AE and AF adjustments is increased.

In addition, the image pickup apparatus can cancel the automatic shooting if a shooting cancellation time elapses before the photographer image is detected from the subject image and inform the photographer of the cancellation of shooting by means of a communication device. Thus, even in the cases where the photographer erroneously activates the self-timer shooting mode or forgets executing the self-timer shooting mode, the apparatus can surely cancel the automatic shooting and makes the photographer aware of the set-up of the self-timer shooting mode.

The image pickup apparatus may also carry out the automatic shooting forcibly when the shooting cancellation time elapses before the photographer image is detected from the subject image. The apparatus therefore can execute the self-timer shooting even if the photographer cannot be detected for some reason.

Moreover, according to the image pickup apparatus of the present invention, in the self-timer shooting mode, after the photographer image is detected from the subject image, the face blur amount detector detects the face blur amount with regard to the photographer image. The system controller of the apparatus in turn compares the face blur amount with a predetermined threshold value, and derives as updating time the time lapsed until the blur amount becomes less than or equal to the threshold value. If the blur amount does not become less than or equal to the threshold, the system controller derives the updating time by adding additional time to a reference countdown period of time. The controller then averages the reference countdown period of time and the updating time thus obtained to handle the resultant average value as a renewed reference countdown period of time. Accordingly, the image pickup apparatus can automatically utilize a suitable countdown period of time for the personality of the photographer without being input by the photographer at his/her option.

In the image pickup apparatus of the present invention, the face detection by the face detector and the face examination by the system controller are carried out constantly in the self-timer shooting mode so as to keep checking if the photographer is in the photographing area. In the case where the photographer image has been once detected from the subject image and is undetectable afterward, the apparatus cancels the automatic shooting after a lapse of a face-missing permissible time from the undetection of the photographer. For instance, when the photographer notices a camera setting error and goes back to the camera, the apparatus reliably cancels the automatic shooting to prevent an undesired image being taken and eliminate the waste of power consumption.

Furthermore, in the self-timer shooting by the image pickup apparatus of the present invention, when the face detector performs the face detection and the system controller performs the face examination, if the photographer image is detected from the subject image, the apparatus can automatically turns off its display. By contrast, if the photographer cannot be detected, the apparatus can automatically turns on the display. Thus, the display can be turned off when the photographer does not confirm the picked up image on the display and turned on when to confirm the image.

Moreover, in the image pickup apparatus of the present invention, a moving speed of the photographer is prestored. In the self-timer shooting by the apparatus, a subject distance measurement section measures a subject distance from the apparatus to a subject position, and the system controller calculates a traveling time for the photographer on the basis of the moving speed and the subject distance. The apparatus can examine the countdown period of time on the basis of the calculation results, thereby improving the probability of taking a photo of the photographer who can hold a pose in the shooting area. Since such an apparatus does not require a face extraction function, a process of registering the face data of the photographer can be omitted.

Also, in the self-timer shooting by the image pickup apparatus of the present invention, the vibration sensor measures a vibration amount of the apparatus, and the system controller then compares the measured apparatus vibration amount with a predetermined threshold value. If the measured amount exceeds the threshold value, the apparatus can cancel the automatic shooting. Therefore, in the cases where an angle-of-view is significantly shifted during the countdown as compared with that at the beginning of the self-timer shooting, the apparatus reliably cancels the automatic shooting, thereby avoiding taking a useless off-angle shot and eliminating wasteful power consumption.

BRIEF DESCRIPTION OF THE DRAWINGS

The objects and features of the present invention will become more apparent from consideration of the following detailed description taken in conjunction with the accompanying drawings in which:

FIGS. 3A and 3B schematically illustrate a side and a top view of a situation of self-timer shooting, respectively, in the illustrative embodiment shown in FIG. 1;

FIGS. 4A and 4B schematically illustrate a side and a top view of another situation of self-timer shooting, respectively, in the illustrative embodiment;

FIGS. 5A and 5B schematically illustrate a side and a top view of yet another situation of self-timer shooting, respectively, in the illustrative embodiment;

FIG. 12 is a flowchart useful for understanding the self-timer shooting operation for controlling a display in response to the detection of a photographer in the illustrative embodiment;

FIG. 17 is a flowchart useful for understanding a self-timer shooting operation depending on a vibration amount of the image pickup apparatus shown in FIG. 16.

DESCRIPTION OF THE PREFERRED EMBODIMENTS

Figure 1:
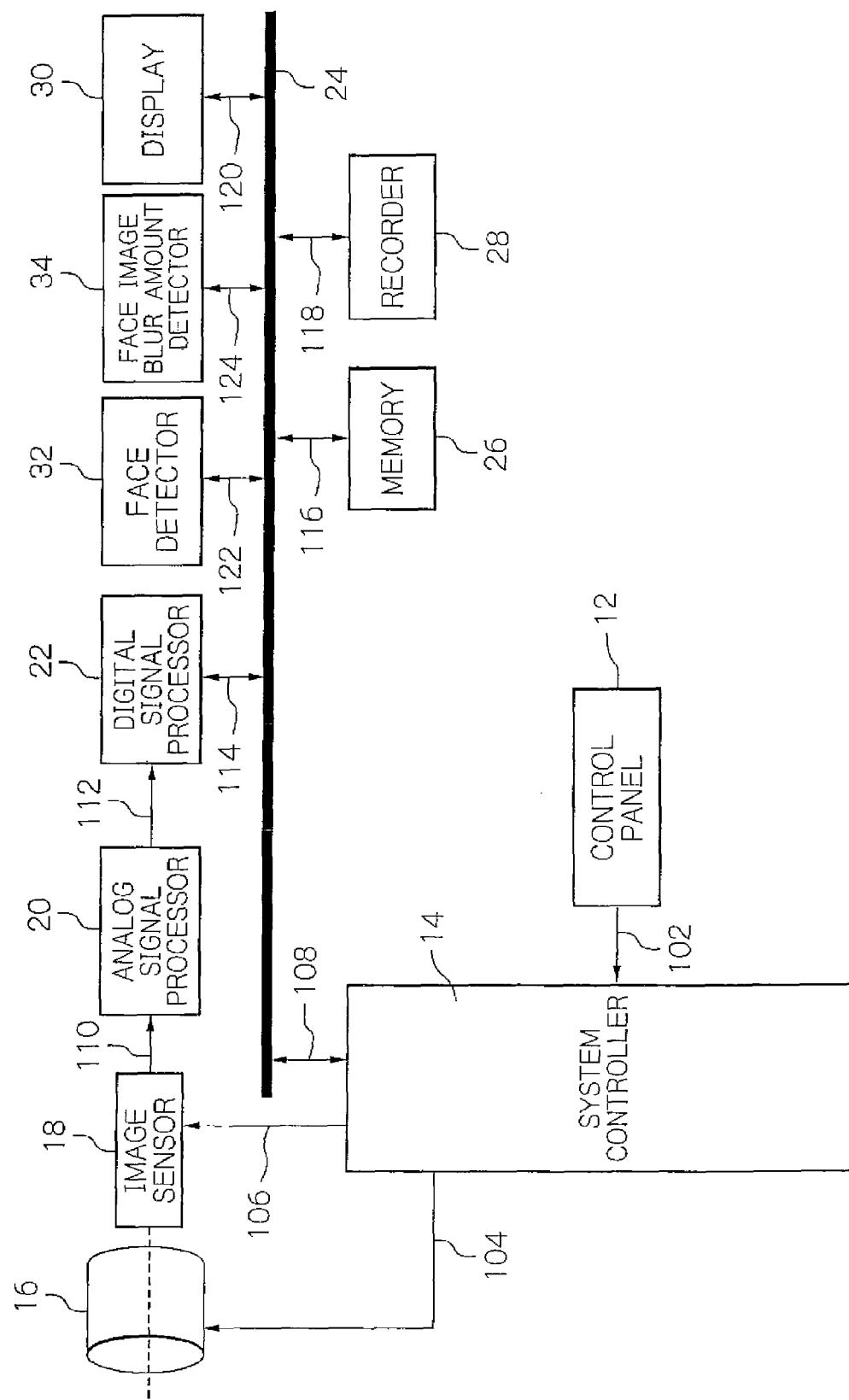
FIG. 1 is a schematic block diagram showing a preferred embodiment of an image pickup apparatus in accordance with the present invention.

With reference to the accompanying drawings, an illustrative embodiment of an image pickup apparatus according to the present invention will be described in detail. Referring first to FIG. 1, the image pickup apparatus of the illustrative embodiment, generally 10, such as a delayed action still camera, is controlled with a system controller 14 in response to manipulating a control panel 12 in such a fashion that incident light from a subject field is caught via optics 16 to pick up the optical image of an imaging field with an image sensor 18, and the picked-up image data are processed by an analog signal processor 20 and a digital signal processor 22 to generate a digital image signal, which is then transferred to a memory 26, a recorder 28 and a display 30 connected to a date bus 24. In particular, the image pickup apparatus 10 is adapted to detect face image data of a human in the subject field from the image signal by means of a face detector 32 when the image is taken by a shooting using a self-timer and to control the self-timer shooting depending on the resultant detection. Note that parts not directly relevant to understanding of the present invention will neither be described nor shown for avoiding redundancy.

The control panel 12 is a manual operating unit that is adapted to receive instructions from an operator. The control panel 12 has a function of feeding an operation signal 102 to the system controller 14 according to the status of the manual operation performed by the operator, e.g. an operated stroke of a shutter release key, not shown. In the following description, signals are designated by reference numerals indicating connections on which they appear.

The control panel 12 of the illustrative embodiment has a function for setting a self-timer mode. For instance, the self-timer or other modes may be selectively set up by means of an operation dial or a cursor button, not shown, of the panel, and then some mode required for a shooting is decided by an enter key, also not shown, so as to start the image shooting in the selected mode. When the self-timer mode is selected, the control panel 12 supplies the operation signal 102 indicative of the self-timer shooting to the system controller 14.

The system controller 14 serves as a general controller for controlling the apparatus 10 over all in response to the operation signal 102 fed from the control panel 12, and the controller may be implemented by a processor system including a central processing unit (CPU), for instance.

In the illustrative embodiment, the system controller 14 is adapted to generate control signals in response to the operation signal 102 to feed the generated signals to the respective portions of the circuitry in order to control them. Furthermore, the system controller 14 has an oscillator such as a timing generator, not shown, for generating basic clock signals, which render the apparatus 10 operative, and delivering the generated basic clock signals to those portions.

The system controller 14 can generate control signals for instructing and controlling, for example, the manual shooting using the shutter release key and the automatic shooting in the self-timer, i.e. delayed shooting, mode. The controller 14 can also generate control signals for instructing and controlling automatic focus (AF) and automatic exposure (AE) adjustments. Furthermore, the controller 14 can generate control signals for taking and displaying, during a standby mode where no still image of a subject field is taken, a through image as movie pictures for an angle-of-view confirmation image so as to confirm the subject field being viewed.

The system controller 14 of the illustrative embodiment generates, in response to the operation signal 102, control signals 104 and 106 and feeds the signals 104 and 106 to control the optics 16 and image sensor 18, respectively. In addition, in response to the operation signal 102, the controller 14 generates control signals 108 to deliver the signals 108 over the data bus 24 to control the units connected to the bus 24.

Furthermore, the system controller 14 is designed to pre-store in the memory 26 a reference countdown period of time for automatic shooting in the self-timer mode, e.g. to store the reference countdown period of time input at the discretion of the operator via the operation signal 102. Specifically, the controller 14 in this embodiment can have face image data of a photographer stored and registered beforehand in the memory 26 for automatic shooting in the self-timer mode. The data of such a face image to be registered may, for example, be one picked up by the apparatus 10 or input from an external device to the apparatus 10.

When the self-timer mode is set in response to the operation signal 102, the system controller 14 generates the control signal 108 indicating a command to detect the face of an subject person, and feeds the generated signal 108 over the data bus 24 to the face detector 32, which is in turn controlled so as to detect the face image data of the subject from the image signal of the through image.

The system controller 14 obtains over the data bus 24 the face data 122 of the subject person detected by the face detector 32, and executes face examination by comparing the face data 122 detected by the detector 32 with the face data of the photographer registered beforehand to determine whether or not both data are identical to each other.

When both the data match with each other through the face comparative examination between the registered face data and the detected face data 122, the system controller 14 determines that the photographer is detected and starts a count down, or decrementing, with respect to the reference count-down period of time. When the countdown is completed, the controller 14 automatically generates control signals indicating a command to take an image of the subject field, feeding the signals to the circuitry to control.

The optics 16 comprises, although not illustrated, imaging lenses such as a focusing lens having its focus adjustable. The optics 16 also serves as an optics mechanism, which is driven by the control signal 104 fed from the system controller 14 and through which the light impinging from a desired field to be shot is conducted onto the image sensor 18. The optics 16 may also comprise a shutter mechanism and an aperture system, not shown.

The image sensor 18 comprises, for instance, an imaging surface, i.e. array of photosensitive cells forming a frame of image to be captured and horizontal signal transfer paths, not specifically shown. The imaging surface has a plurality of photosensitive cells corresponding to pixels and a plurality of vertical transfer paths. The image sensor 18 may be a CCD (Charged Coupled Device) or a MOS (Metal Oxide Semiconductor) type of optical sensor.

The image sensor 18 is adapted to photoelectrically convert the optical image of an subject field formed on the imaging surface through the optics 16 in response to the control signal 106 from the system controller 14 to corresponding electrical signals, thereby thus converted signal charges of the pixels being outputted in the form of analog electric signal 110 to the analog signal processor 20.

The plurality of photosensitive cells in the image sensor 18 can be arranged, for example, in a square matrix pattern where the cells are disposed in a row and a column direction at a uniform pitch, or in a so-called honeycomb pattern where the cells are arranged with adjoining ones of the cells shifted in the row and the column direction. Each photosensitive cell is an optical sensor adapted for photoelectrically converting the incident light to a corresponding electric signal depending on the amount of the received light, and thus may be a photodiode, for instance.

The analog signal processor 20 is controlled by the system controller 14 to perform analog signal processing on the analog electric signal 110 fed from the image sensor 18. For instance, the preprocessor 20 may process the analog signal by using circuits such as a correlated double sampling circuit and a gain controlled amplifier, and also implements an analog-to-digital conversion by using an analog-to-digital converter to generate a digital image signal 112 to supply the generated signal to the digital signal processor 22.

The digital signal processor 22 is controlled by the system controller 14 to perform digital signal processing on the digital image signal 112 supplied from the analog signal processor 20. The processor 22 may output a digital image signal 114 obtained by the digital signal processing over the data bus 24 to the memory 26, the recorder 28 or the display 30.

For instance, the digital signal processor 22 may perform processes on the input digital image signal 114 such as offset correction, white balance adjustment, synchronization, interpolation, linear matrixing, gamma correction and luminance-chrominance (YC) conversion.

The memory 26 is adapted to temporarily store digital image signals 116 fed from the various circuits over the data bus 24, e.g. to store the digital image signal 114 processed by the digital signal processor 22.

The recorder 28 is adapted to record a digital image signal 118 fed on the data bus 24, e.g. input the digital image signal 118 delivered from the digital signal processor 22 or the memory 26 for recording. The recorder 28 may comprise information recording media, for example, a memory card incorporating a semiconductor memory device or a package containing a rotary recording carrier, such as a magnetic optical disk. The information recording media may be detachable.

Furthermore, the recorder 28 may compress the input digital image signal 118 to record it, and expand the registered image signal into the output digital image signal 118.

The display 30 is adapted to visually display an image represented in a digital image signal 120 supplied on the data bus 24, e.g. from the digital signal processor 22, the memory 26 or the recorder 28. As the display 30, a liquid crystal display (LCD) panel may be employed, for instance.

The face detector 32 is controlled by the system controller 14 and designed to be responsive to the digital image signal 114 fed by the digital signal processor 22 over the data bus 24 to detect a human face image 122 from the image data represented in the image signal 114. The face detector 32 may employ any face detection technique such as edge detection, skin color detection and minutiae detection. Byway of example, when the self-timer mode is selected in the apparatus 10, the face detector 32 of the illustrative embodiment extracts the face data 122 from the digital image signal 114 obtained by the through-image shooting, i.e. stand-by or monitoring mode, to supply the extracted face data 122 on the data bus 24 to the system controller 14.

Next, the operation of self-timer shooting in the illustrative embodiment of the image pickup apparatus 10 will be described with reference to the flowchart shown in FIG. 2.

Firstly, the photographer, who may also be a subject to be shot in this example, registers his/her face data beforehand so that the data is stored in the image pickup apparatus 10 (step S202). Furthermore, the photographer prestores a reference countdown period of time for self-timer shooting in the apparatus 10 (step S204). The reference countdown period of time may be on the timescale of seconds.

As shown in FIGS. 3A and 3B, if the photographer 134 executes, by using a camera 132 employing the image pickup apparatus 10, a self-timer shooting of a predetermined shooting area 136, the photographer 134 operates the camera 132 and the operating unit 12 so that the self-timer mode is set in the system controller 14 of the apparatus 10, thereby activating the self-timer shooting mode (step S206). On this occasion, the apparatus 10 may perform a through-image shooting in order to display an angle-of-view confirmation image on the display 30.

In the image pickup apparatus 10, when the image of the shooting area 136 is captured as motion pictures by the through-image shooting, the incident light from the shooting area 136 is received via the optics 16 into the image sensor 18, and therefore the analog electric signal 110 representing the image of the shooting area 136 can be obtained by the image sensor 18. In addition, the signal 110 is processed by the analog signal processor 20 and the digital signal processor 22 so that the digital image signal 114 indicative of the shooting area 136 is generated in the digital signal processor 22.

In this embodiment, the digital image signal 114 is subjected to the face detection in the face detector 32 to extract the human face data 122 of the shooting area 136 (step S208).

The face data 122 thus extracted in the face detector 32 is compared with the registered face data of the photographer stored in advance, e.g. by the system controller 14, so as to examine the face data 122 (step S210). When both face data match with each other as a result of the face examination, the controller 14 determines that the photographer's image is detected from the through-image, i.e. the subject image and then proceeds with step S212; otherwise determines that the photographer is not detected and then the control goes back to step S208.

For example, when the photographer 134 is moving away from the image pickup apparatus 10 to enter the shooting area 136 as shown in FIGS. 4A and 4B, the registered face data of the photographer 134 cannot be detected from the extracted face data 122 in the face detector 32. Then, when the photographer 134 enters the shooting area 136 as shown in FIGS. 5A and 5B, the registered face date can be detected from the extracted face data 122, and therefore it can be determined that the photographer is detected.

In step S212, the system controller 14 executes a countdown for self-timer shooting. Thus, the countdown is not started unless the photographer 134 is present in the shooting area 136.

The countdown is performed by the controller 14 in such a manner that, for instance, the reference countdown period of time is set as a countdown initial value, which will in turn decrement over time elapsing from the start time. Then, the controller 14 determines whether or not the countdown value, i.e. count, becomes equal to a predetermined value, e.g. zero, that is, whether or not the countdown is completed (step S214) If the count is equal to zero, the controller 14 determines that the countdown is completed and the shooting operation proceeds to step S216.

In step S216, an automatic shooting in the self-timer mode is executed to pick up the image of the shooting area 136. By the automatic shooting, the incident light from the shooting area 136 is received via the optics 16 by the image sensor 18, which in turn produces the analog electric signal 110 representing the image of the shooting area 136. In addition, the signal 110 is processed by the analog signal processor 20 and the digital signal processor 22 to produce the digital image signal 114 indicative of the shooting area 136. The digital image signal 114 is transferred on the data bus 24 and stored in the recorder 28 (step S218) or is displayed on the display 30.

Figure 6:
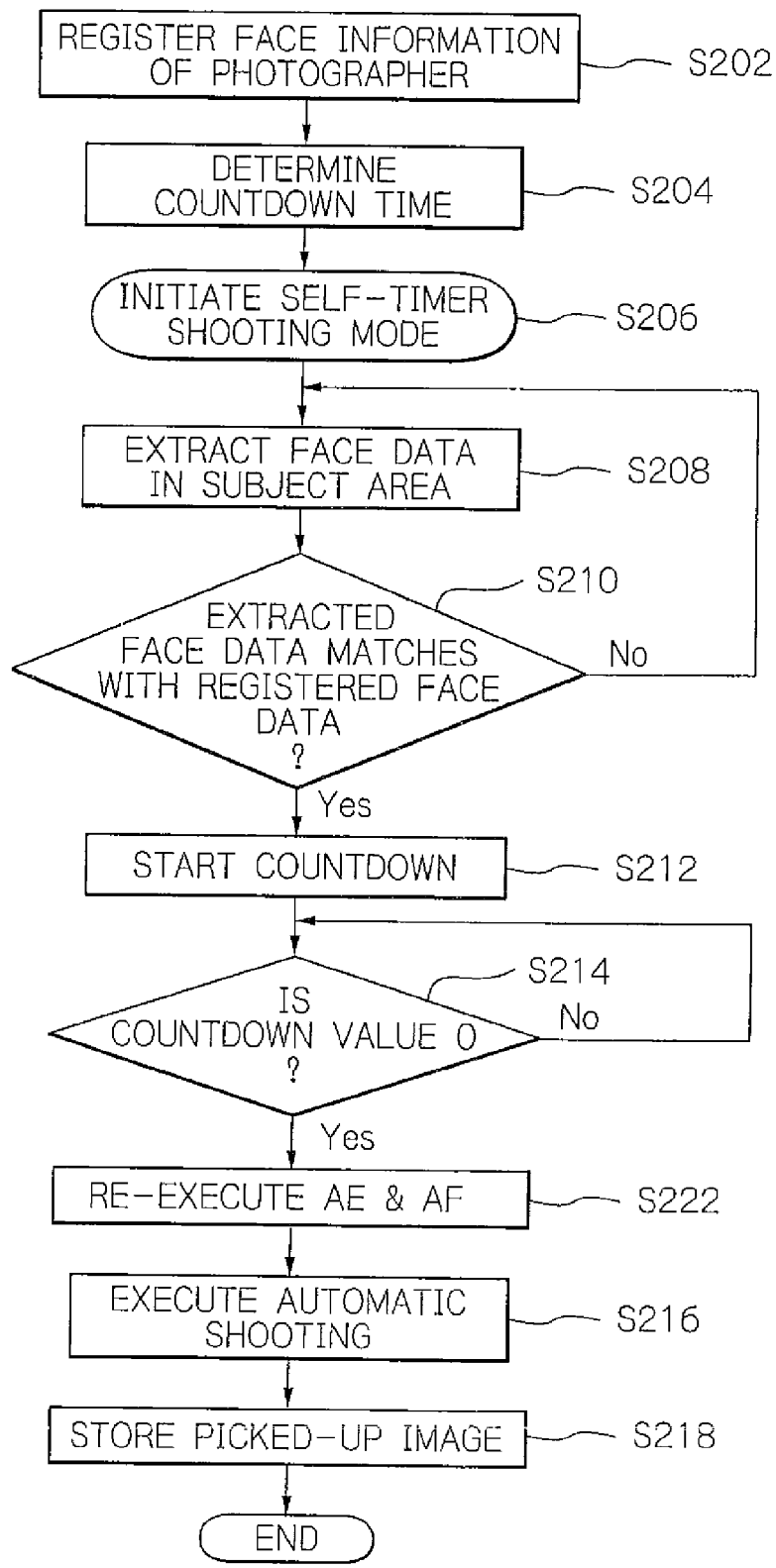
FIG. 6 is a flowchart useful for understanding a self-timer shooting operation where AE and AF controls are performed for the second time in the illustrative embodiment.

The image pickup apparatus 10 according to the illustrative embodiment may perform, as shown in the flowchart illustrated in FIG. 6, the self-timer shooting with effective AE and AF control. With regard to FIG. 6, the description about the operations in steps S202 to S218 that have made in respect to FIG. 2 will not be repeated.

In accordance with the image pickup apparatus 10 depicted in FIG. 6, when the face examination by the system controller 14 in step S210 results in the extracted face data 122 detected in the face detector 32 matching with the prestored registered face data to thereby determine that the photographer is detected in the subject field, the countdown is started for self-timer shooting in step S212. At the same time, AE and AF adjustments are performed automatically on the image of the shooting area 136 for the second time (step S222) in order to improve the precision of AE and AF control. The second execution of AE and AF adjustments may be done any time from the start of the countdown in step S212 to the automatic shooting in step S216, thereby reducing the possibility of overexposure and out-of-focus of the image prior to actual shooting after the countdown for self-timer shooting is started.

Figure 7:
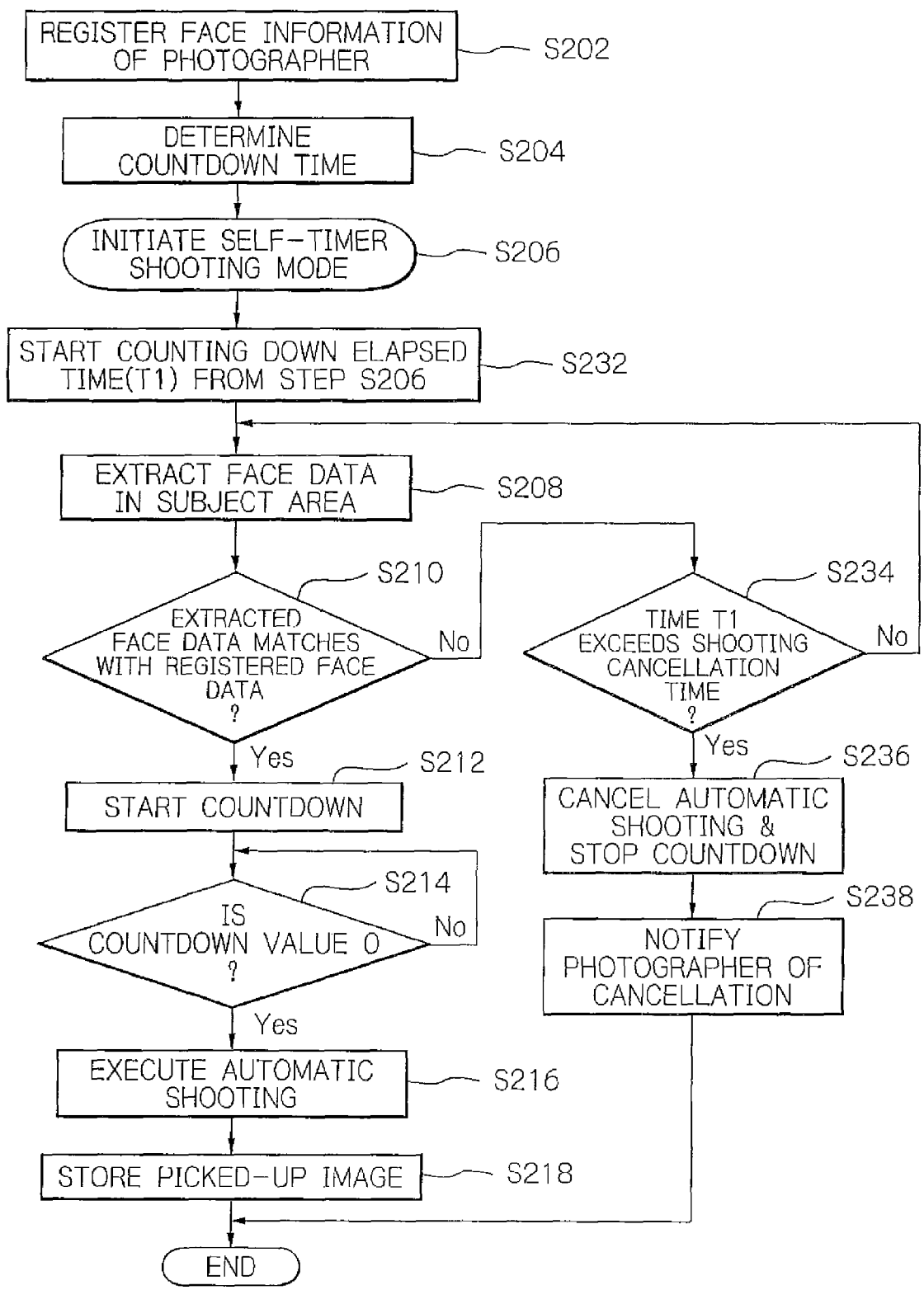
FIG. 7 is a flowchart useful for understanding an operation for forcedly canceling an automatic shooting in the illustrative embodiment.

Furthermore, the image pickup apparatus 10 according to the instant embodiment can, as shown in the flowchart shown in FIG. 7, cancel the automatic shooting forcibly if the photographer cannot be detected. In FIG. 7, the description about the operations in steps S202 to S218 that have made in respect to FIG. 2 will not be repeated.

In accordance with the image pickup apparatus 10 in FIG. 7, if the photographer cannot be detected before a predetermined period has lapsed since the start of the face detection by the face detector 32 and the face comparison examination by the system controller 14, it is then determined that the self-timer shooting can be canceled. In the apparatus 10, the predetermined period, i.e. shooting cancellation time, is preset and stored in the system controller 14 or memory 26.

In the illustrative embodiment, as shown in FIG. 7, when the self-timer shooting mode is activated in step S206, for instance, the system controller 14 of the apparatus 10 starts counting an elapsed time T1 from the start of the self-timer shooting (step S232).

Subsequently, if, by the face examination in step S210, the extracted face data 122 detected in the face detector 32 does not match with the prestored registered face data and thus it is determined that the photographer is undetected, it is then determined whether or not the elapsed time T1 exceeds the shooting cancellation time stated above (step S234). In cases where the cancellation time does not pass yet, the operation is returned to step S208 in which the face detection and examination are carried out once again. If the cancellation time passes away, the operation proceeds to step S236.

In step S236, the self-timer shooting with the image pickup apparatus 10 is canceled so as to turn off the self-timer mode and stop the countdown, for instance.

When the self-timer shooting is thus canceled, the image pickup apparatus 10 notifies the photographer of the cancellation by using a communication device that is provided on the apparatus 10 although not shown and produces, e.g. light or sound (step S238).

Figure 8:
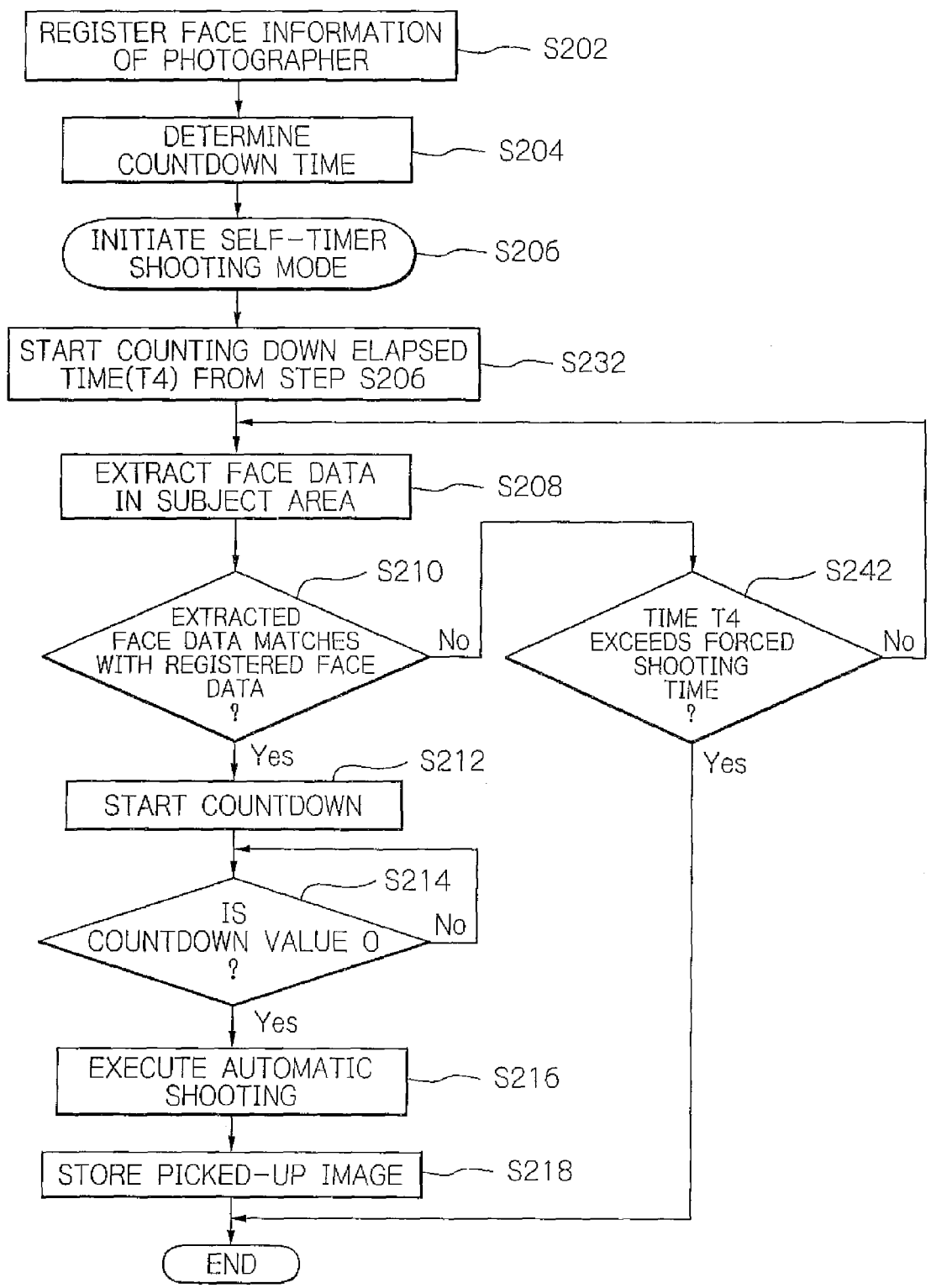
FIG. 8 is a flowchart useful for understanding an alternative operation for forcedly executing the automatic shooting in the illustrative embodiment.

Furthermore, as shown in the flowchart illustrated in FIG. 8, the image pickup apparatus 10 according to the instant embodiment may forcibly execute the automatic shooting if the photographer cannot be detected. In respect of FIG. 8, the description about the operations in steps S202 to S218 that have made in respect to FIG. 2 and the description about step S232 will not be repeated.

In this case as shown in FIG. 8, in the image pickup apparatus 10, if the photographer cannot be detected after the predetermined period lapses since the start of the face detection by the face detector 32 and the face examination by the system controller 14, it is determined that the self-timer shooting can be executed forcibly. In the apparatus 10, the predetermined period, i.e. forced shooting time, is preset and stored in the system controller 14 or memory 26.

In the illustrative embodiment, as shown in FIG. 8, when, by the face examination in step S210, the extracted face data 122 detected by the face detector 32 does not match with the prestored registered face data and it is determined that the photographer is undetected, it is determined whether or not an elapsed time T4 exceeds the forced shooting time (step S242). In cases where the forced time does not pass yet, the operation is returned to step S208 in which the face detection and the face examination are carried out once again. If the forced time passes, the operation proceeds to step S216.

At this time, the automatic shooting is executed forcibly in step S216 regardless of whether or not the countdown for self-timer shooting by the apparatus 10 is completed.

The illustrative embodiment may also be adapted such that the image pickup apparatus 10 can determine a countdown period of time in accordance with the personality of a photographer, who is of course also a subject person to be photographed. For instance, the apparatus 10 can determine the countdown period of time depending on a period of time elapsing until the movement of the face of the photographer settles down, e.g. the amount of blur included in an image caused by the movement converges.

By way of example, the image pickup apparatus 10 includes a face blur amount detector 34, FIG. 1. The face blue amount detector 34 is adapted to use the digital image signal 114 processed by the digital signal processor 22 and the face data 122 detected by the face detector 32 when shooting a subject containing the photographer to detect a blur amount 124 of the photographer's face in the captured image. The detector 34 may be adapted to, for instance, measure a movement vector of the face data 122 to thereby detect the blur amount of the face image on the basis of the measured face movement vector to supply the detected face blur amount 124 to the system controller 14.

For example, the face blur amount detector 34 can store face data 122 obtained by a certain shooting for the last face data. The detector 34 examines whether or not the current face data 122 obtained in the subsequent shooting is matched with the last face data stored, and uses the resultant matching to measure the face movement vector so as to detect the face blur amount on the basis of the measured face movement vector.

In the embodiment, the system controller 14 can obtain the face blur amount 124 from the face blur amount detector 34 over the data bus 24, and determine, in accordance with the face blur amount 124, whether or not the photographer is standing ready in the shooting area.

The system controller 14, for example, compares the blur amount 124 of the photographer's face image with a predetermined threshold value during the period from the beginning to the end of the countdown for self-timer shooting, and then obtains an average value between an updating time resultant from the comparison and the reference countdown period of time to determine the resultant average as updated reference countdown period of time. In this embodiment, a prestored reference countdown period of time is used for a first self-timer shooting, and the updated reference countdown period of time is used for subsequent self-timer shootings.

If the face blur amount becomes less than or substantially equal to the threshold value prior to the lapse of the reference countdown period of time in the self-timer shooting mode, then the system controller 14 determines that the reference countdown period of time is sufficient in length to the photographer to get ready for shooting and defines an elapsed time, which elapses before the blur amount becomes lower than the threshold, as an updating time. Otherwise, the controller 14 determines that the reference countdown period of time is not sufficient to the photographer to get ready, and adds a predetermined additional time to the reference countdown period of time to thereby define the resultant addition as the updating time.

Figure 9:
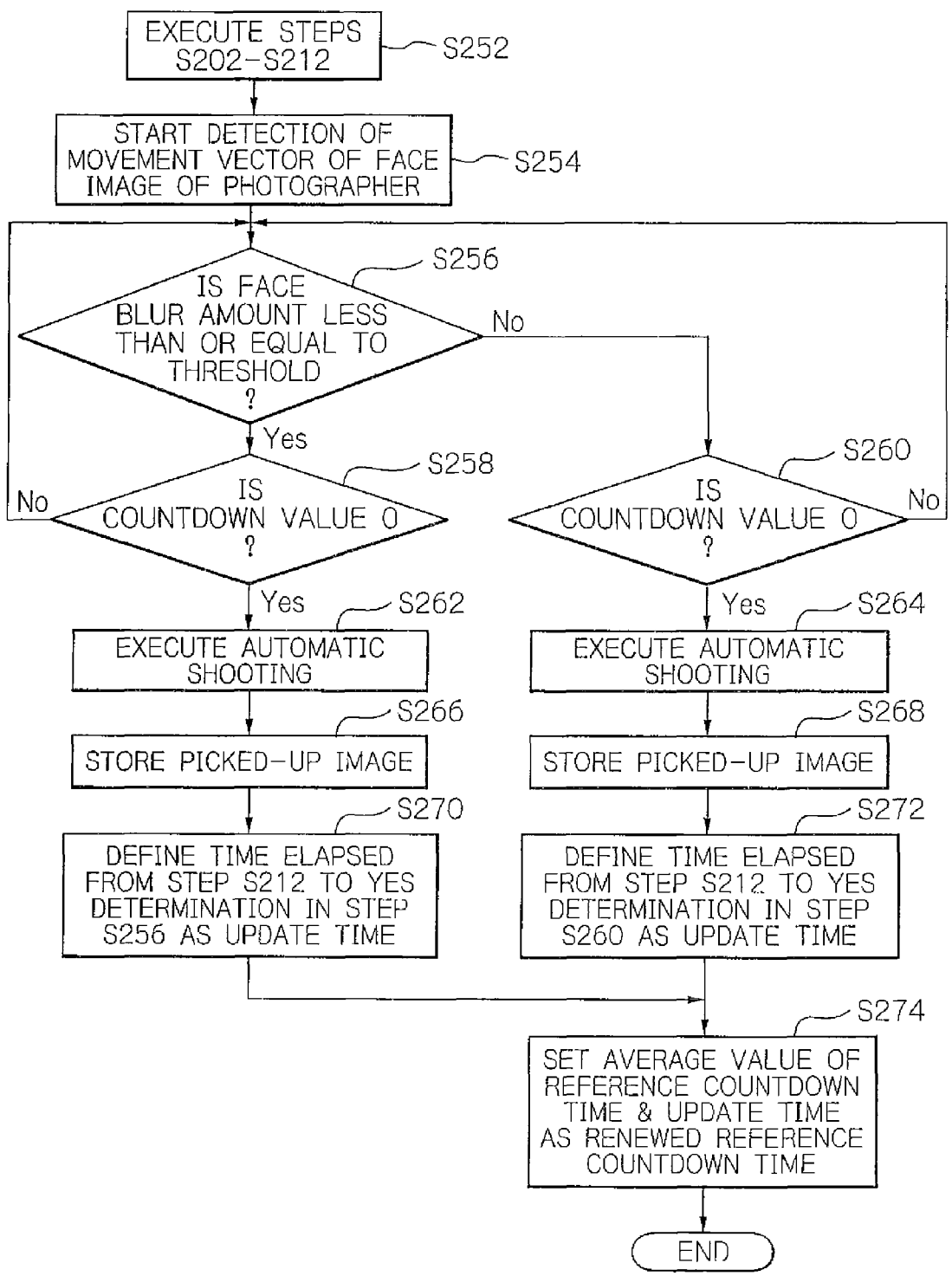
FIG. 9 is a flowchart useful for understanding the self-timer shooting when operative depending on a face blur amount in the illustrative embodiment of the image pickup apparatus shown in FIG. 1.

Next, the operation of self-timer shooting in the embodiment of the image pickup apparatus 10 will be described with reference to the flowchart shown in FIG. 9.

Figure 2:
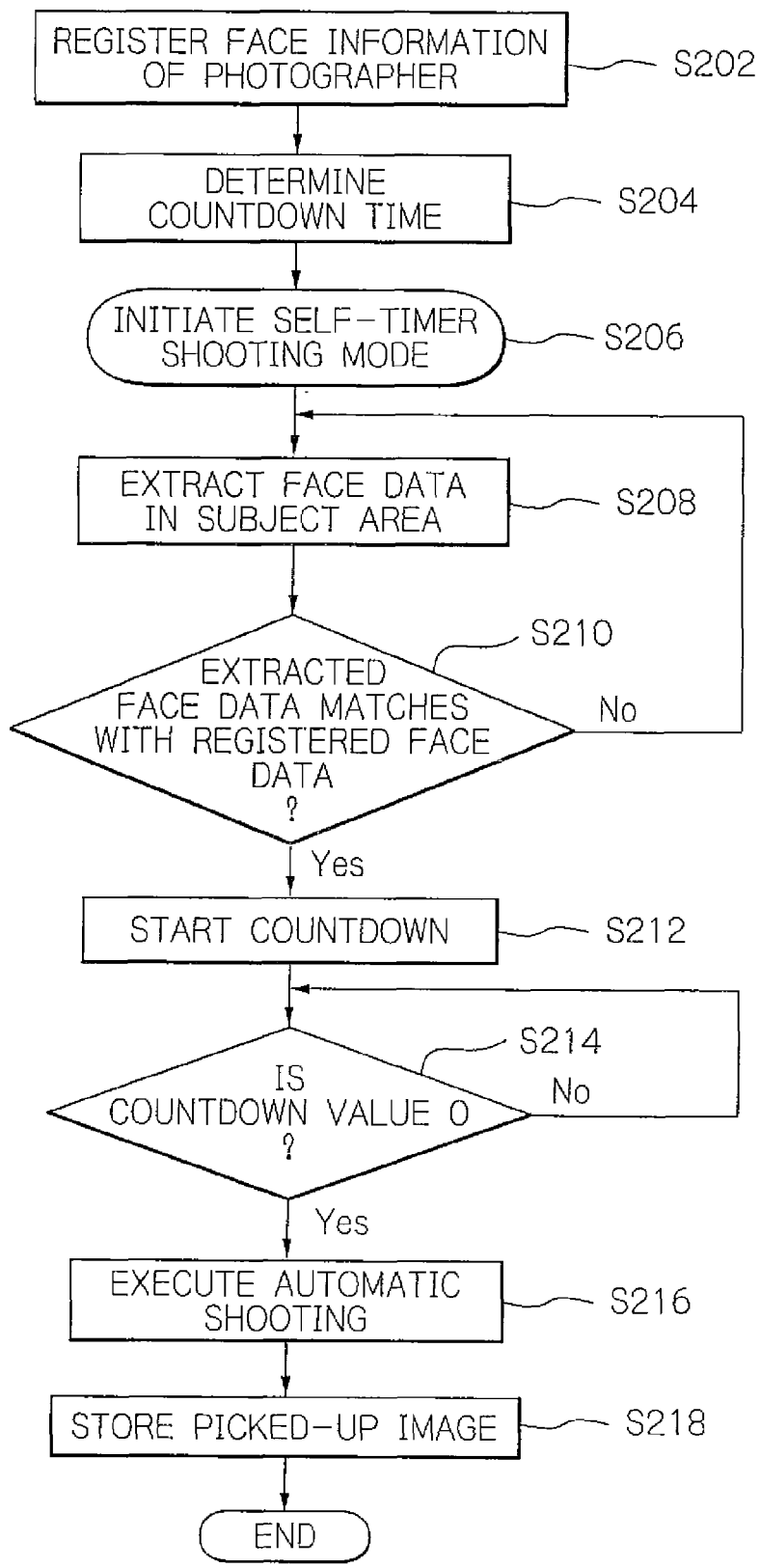
FIG. 2 is a flowchart useful for understanding an operation of the embodiment of the image pickup apparatus shown in FIG. 1.

In the illustrative embodiment, steps S202 to S212 are executed as in the case shown in FIG. 2, and after the detection of photographer, a self-timer shooting is performed according to the reference countdown period of time (step 252).

When the countdown is started in step S212, the operation proceeds to step S254 in which the face blur amount detector 34 of the apparatus 10 starts detecting a blur amount 124 of the photographer's face, and, by way of example, the face blur amounts 124 are successively detected by using the angle-of-view confirmation images obtained by the through-image shooting until the countdown is completed. The face blur amount detection may be started simultaneously with the start of the countdown.

The operation then proceeds to step S256 in which the face blur amount 124, if detected by the face blur amount detector 34, is fed over the data bus 24 to the system controller 14 whereat the face blur amount is compared with a predetermined threshold value. If the amount is less than or equal to the threshold, the operation proceeds to step S258; otherwise the operation proceeds to step S260.

The processes in steps S258 and S260 are carried out as in step S214 shown in FIG. 2 to determine whether or not the countdown is completed. If the countdown is completed, the operations go to steps S262 and S264, respectively; otherwise each operation returns to step S256 to repeat the detection of the face blur amount in the face blur amount detector 34 and the comparison of the detected amount and the threshold in the system controller 14.

The processes in steps S262 and S264 are carried out as in step S216 in FIG. 2 to execute an automatic shooting, and then the operations proceed to steps S266 and S268, respectively, to store the picked up images in the recorder 28 as is the case with step S218 in FIG. 2.

After the process in step S266, the operation proceeds to step S270 in which, for example, the system controller 14 decides an elapsed time, which elapses after starting the countdown in step S212 before the blur amount becomes less than or equal to the threshold value in step S256, as the updating time. The updating time is then temporarily written, e.g. in the memory 26.

On the other hand, after the process in step S268, the operation goes to step S272 in which, for instance, the system controller 14 decides an elapsed time, which elapses after starting the countdown in step S212 before completing the countdown in step S260, as the updating time, that is, decides the updating time corresponding to the addition of the predetermined additional time to the reference countdown period of time. The updating time is also temporarily written, e.g. in the memory 26.

Both steps S266 and S268 lead to step S274. In step S274, for example, the system controller 14 averages the reference countdown period of time stored in step S202 and the updating time obtained in step S266 or S268 so as to decide the resultant average as a renewed reference countdown period of time.

In this way, the reference countdown period of time is renewed in accordance with the personality of a photographer in this embodiment of the image pickup apparatus 10, so that even if a time, which is taken to get ready in a shooting area after selecting a self-timer shooting, depends on photographers, a suitable countdown period of time can automatically be decided in order to perform the self-timer shooting.

In the illustrative embodiment of the image pickup apparatus 10, the apparatus 10 may suspend an automatic shooting when the photographer who was once detected has gone off the shooting area.

In the illustrative embodiment, for example, even after the detection of the photographer by the system controller 14, the face detector 32 constantly detects faces of people in the shooting area until a countdown for self-timer shooting is finished.

In performing the self-timer shooting, the system controller 14 of the embodiment can use the result of the face comparative examination between the registered face data and the extracted face data 122 to determine whether or not the photographer is in the shooting area. In the self-timer shooting mode, the system controller 14 constantly performs the face examination until the completion of the countdown even if the extracted face data 122 matches with the registered face data and thereby the photographer can be detected. Furthermore, if the photographer is detected and then the photographer becomes undetectable for the reason that the matching is lost between the registered face data and the extracted face data 122, the controller 14 counts an elapsed time T2 from the time point of failing detection. If the elapsed time T2 exceeds a predetermined period of time, the controller 14 may decide that the self-timer mode can be suspended. In the apparatus 10 of the present invention, the above-mentioned predetermined period of time, i.e. a permissible time of missed-face, is beforehand determined and stored in the system controller 14 or the memory 26.

Moreover, in the self-timer shooting mode, in cases where the photographer can be detected again after he or she, once detected, becomes undetectable, the system controller 14 determines that the self-timer shooting can be carried on and thereby cancels the suspension of the self-timer mode, that is, proceeds to the self-timer shooting. In this way, when the system controller 14 decides to continue the self-timer shooting, the controller 14 may stop and reset the countdown of elapsed time T2 starting from the undetection of the photographer, in which case the controller 14 also may set, as a countdown period of time for automatic shooting, a second countdown period of time which is shorter than the reference countdown period of time.

Figure 10:
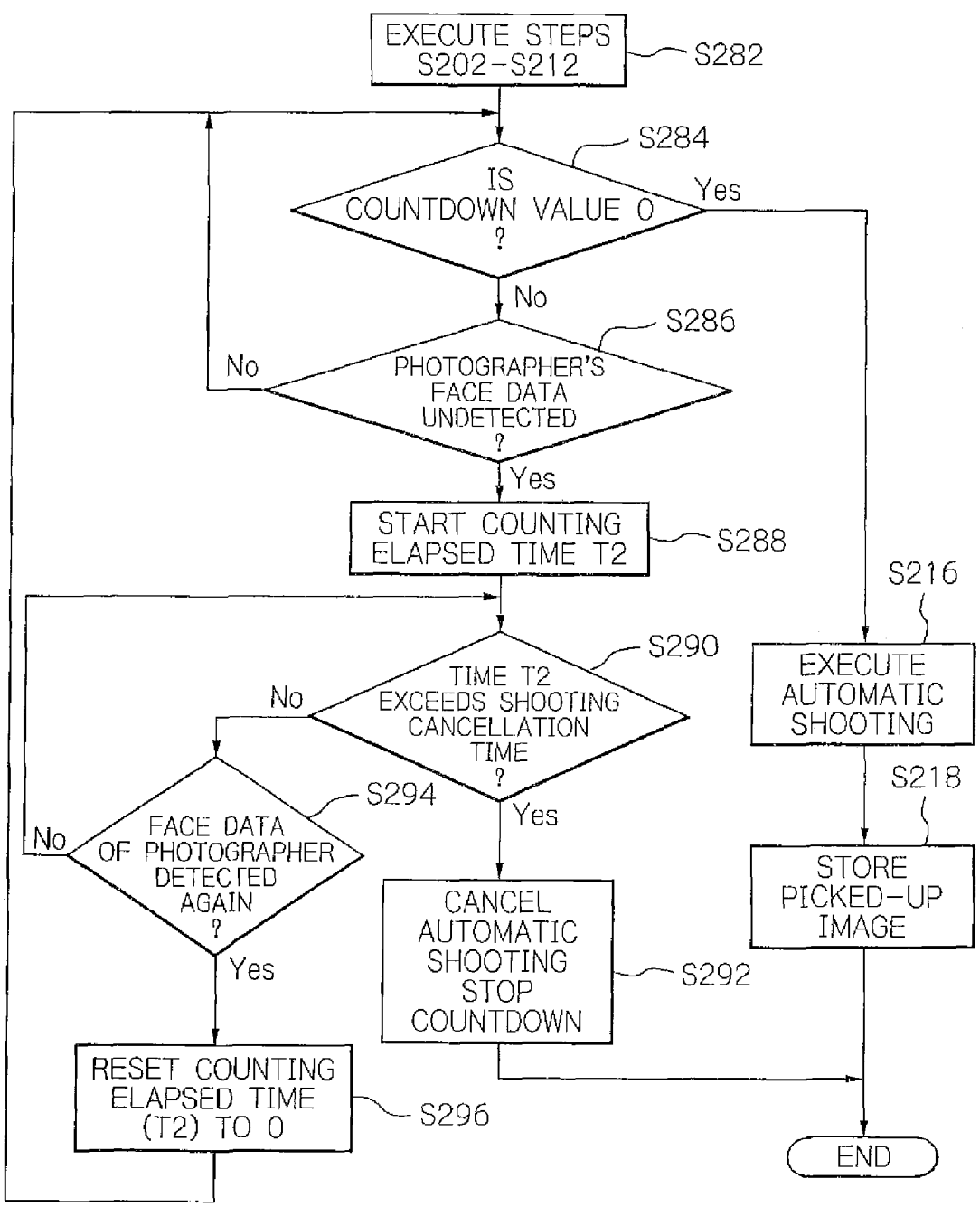
FIG. 10 is a flowchart useful for understanding the self-timer shooting operation in the embodiment of the image pickup apparatus where a photographer once detected becomes undetectable.

Next, such an operation of self-timer shooting in the illustrative embodiment of the image pickup apparatus 10 will be described with reference to the flowchart shown in FIG. 10.

In the illustrative embodiment, steps S202 to S212 are carried out correspondingly to the operation depicted in FIG. 2, and after the detection of the photographer, a self-timer shooting is executed according to a reference countdown period of time (step S282).

After the countdown is started in step S212, the operation goes to step S284 in which a process is carried out as in step S214 shown in FIG. 2 to determine whether or not the countdown is completed. If the countdown is not completed, the control proceeds to step S286. By contrast, in cases where the countdown is completed, the operation proceeds to step S216 in order to execute the automatic shooting as described above, and subsequently goes to step S218 to store a captured image in the recorder 28 as described earlier.

In the stage of step S286, the countdown for self-timer shooting is in process, so that the face examination is performed continuously in the face detector 32. The results of the examination are supplied to the system controller 14, and the controller 14 in turn determines whether or not the photographer is detected by the face examination. When the photographer is detected, the operation goes back to step S284 to continue the countdown; otherwise the operation goes to step S288.

Figure 11A:
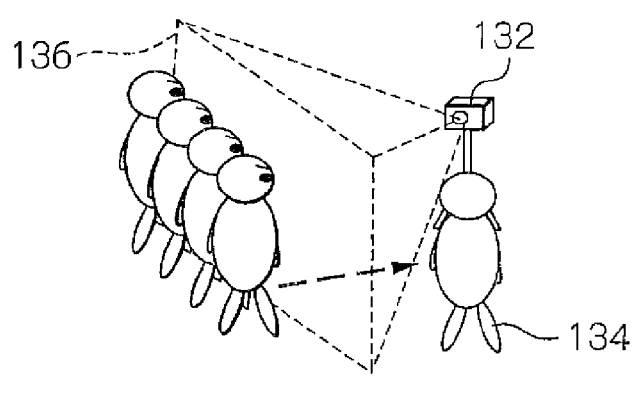
FIGS. 11A and 11B schematically illustrate a side and a top view of another situation of self-timer shooting, respectively, in the operation of the image pickup apparatus shown in FIG. 10.
Figure 11B:
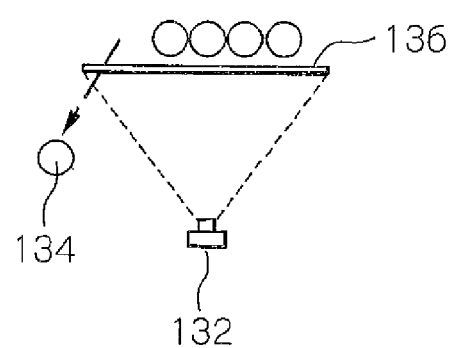

In step S288, the system controller 14 determines that the photographer 134 who once entered in the shooting area 136 as illustrated in FIGS. 5A and 5B has gone out from the area for some reason as shown in FIGS. 11A and 11B, i.e. determines that the photographer is not present in the shooting area, thereby counting the time T2 elapsed since the photographer was undetectable in step S286.

Then, a determination is made in step S290 as to whether or not the elapsed time T2 starting when the photographer was not detected exceeds the preset permissible time of missing the face. If the time T2 exceeds the preset time, the operation proceeds to step S292; otherwise goes to step S294.

In step S292, when the permissible time of missed-face runs out, it is determined that, for instance, the photographer is gone to see the camera because he/she has noticed some error in the camera settings, thereby canceling the self-timer mode of the image pickup apparatus 10, turning off the self-timer mode and stopping the countdown as with step S236 shown in FIG. 7.

As to step S294, since the image pickup apparatus 10 determines whether or not the photographer is back in the shooting area until the permissible time of missed-face passes over. In the apparatus 10, the face detection is ongoing by the face detector 32, the system controller 14 can carry out the face examination to examine whether or not the photographer can be detected again. If the photographer cannot be detected once again, the operation returns to step S290 to repeat the determination of the permissible time of missed-face. In the repetition, if the photographer can be detected again, the operation goes to step S296.

In step S296, in response to the second detection of the photographer, it is determined that the self-timer shooting is able to be carried on. Then, the countdown of elapsed time from the undetecting point of the photographer is stopped so as to continue the self-timer shooting, and the elapsed time is set to zero to be reset.

In continuing the self-timer shooting as thus described, if the countdown period of time for automatic shooting is reset and another countdown is started according to the reference countdown period of time, it takes some period of time until the shooting is executed. Thus, a second countdown period of time shorter than the reference countdown period of time may be newly determined.

In the illustrative embodiment, the image pickup apparatus 10 can control an image display in the display 30 in response to the detection of the photographer.

In the instant embodiment, even after the system controller 14 detected the photographer by the face examination, the face detector 32 constantly continues to detect the faces of people staying in the shooting area until the countdown for the self-timer shooting is completed.

In performing the self-timer shooting, the system controller 14 can control the indication on the display 30 on the basis of the result of the face comparative examination of the registered face data and the extracted face data 122. The controller 14 controls the display 30 in such a fashion that the image display is turned off if the photographer is detected in the face examination step and turned on if the photographer is not detected.

Furthermore, the system controller 14 in this embodiment may start the countdown for self-timer shooting regardless of the results of the face examination.

Hereinafter, such an operation of self-timer shooting in the embodiment of the image pickup apparatus 10 will be described with reference to the flowchart shown in FIG. 12.

In the illustrative embodiment, steps S202 to S206 are executed as in the case shown in FIG. 2, and then a self-timer shooting is carried out.

The operation then proceeds to step S302, and uses the reference countdown period of time defined in step S204 as in step S212 depicted in FIG. 2 to start a countdown.

By way of example, right after the start of the countdown, steps S208 and S210 are carried out as in FIG. 2 in which the face detector 32 extracts the face data of the photographer and then the system controller 14 performs the face examination on the basis of the registered face data and the extracted face data. In the illustrative embodiment, if both face data are determined as matching each other in step S210, the operation proceeds to step S304; otherwise goes to step S306.

The system controller 14 also controls the display 32 in accordance with the examination result obtained in step S210 such that the display 32 turns the image display off in step S304 because the photographer 134 is in the shooting area 136 and cannot watch the display screen of the camera 132 as illustrated in FIGS. 5A and 5B, or turns the image display on in step S306 because the photographer 134 may leave the shooting area 136 to watch the display screen of the camera 132 as shown in FIGS. 11A and 11B.

Both steps S304 and S306 lead to step S214 to determine whether or not the countdown is completed. If the countdown is not completed, the operation returns to step S208 to control the display 32 again in accordance with the results of the face detection and the face examination. If the countdown is over, the operation proceeds to step S216 in order to execute the automatic shooting as described before and then to step S218 to store the picked up image in the recorder 28 as stated above.

Figure 13:
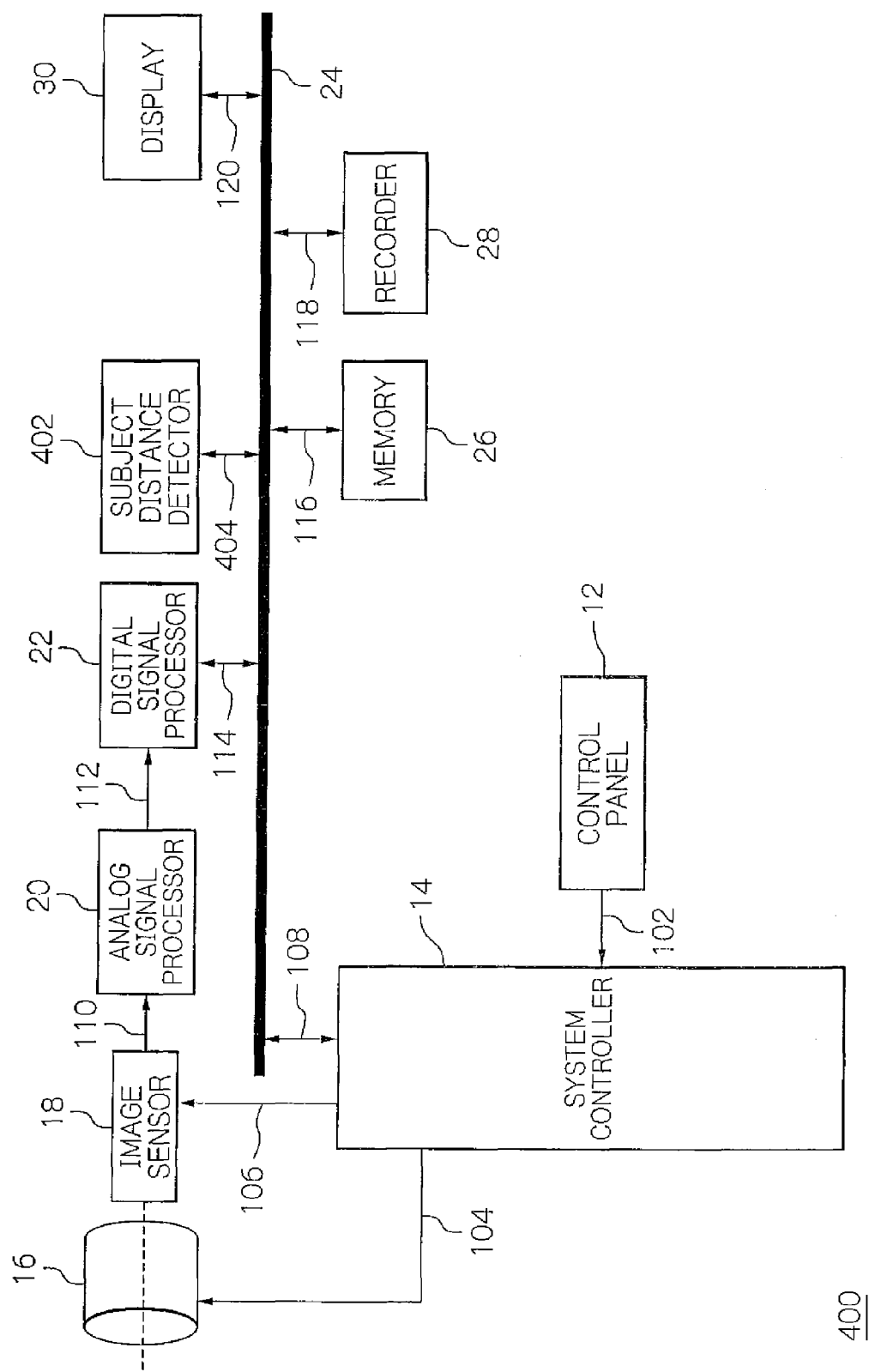
FIG. 13 is a schematic block diagram showing an alternative embodiment of the image pickup apparatus in accordance with the present invention.

In accordance with an alternative embodiment, as shown in FIG. 13, an image pickup apparatus 400 is configured to comprise an subject distance detector 402 to measure the distance between the apparatus 400 and a subject position, thereby determining a countdown period of time for self-timer shooting depending on the measured distance.

The image pickup apparatus 400 of the alternative embodiment may be constituted without the face detector 32 and the face blur amount detector 34. Descriptions will hereinafter not be repeated for the constituent elements in apparatus 400 that correspond to those in the image pickup apparatus 10 shown in FIG. 1.

To the subject distance detector 402, distance measuring equipment, such as a distance sensor, may be applied to thereby measure a subject distance from the apparatus 400 to the subject position and feed the measured distance value 404 to the system controller 14 over the data bus 24.

In the self-timer shooting mode in the alternative embodiment, the system controller 14 obtains the value of subject distance 404 from the subject distance detector 402, and uses the subject distance 404 and an average moving speed of man such as a photographer to calculate or estimate a traveling time in which the photographer moves from the apparatus 400 to the subject position and strikes a pose, thereby determining the countdown period of time on the basis of the derived traveling time.

The system controller 14 may define the countdown period of time which is a value resultant from adding specified additional time to the derived traveling time. Alternately, the controller 14 may store such traveling time and specified additional time in advance or allow the operator to input them.

Figure 14:
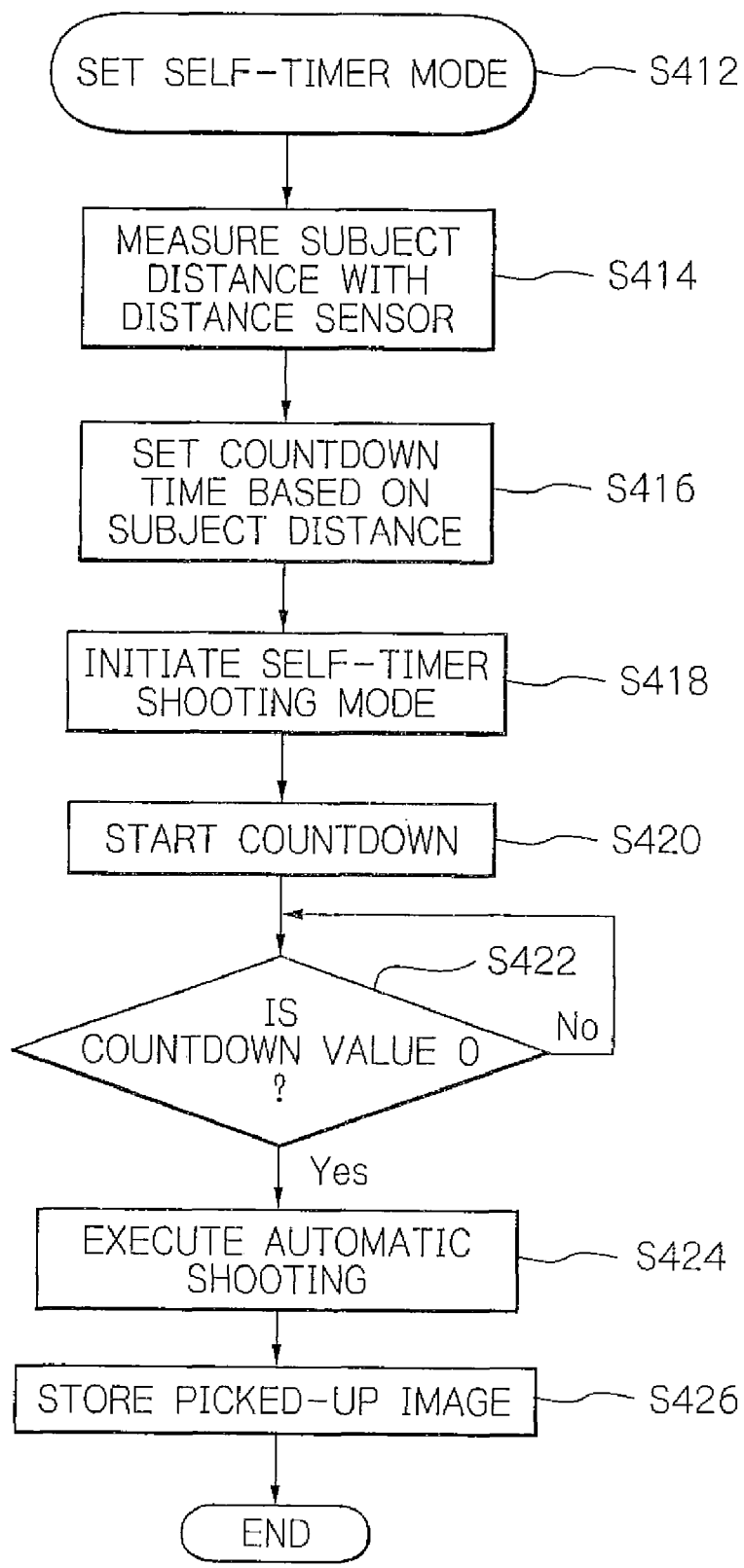
FIG. 14 is a flowchart useful for understanding a self-timer shooting operation depending on a subject distance in the alternative embodiment of the image pickup apparatus shown in FIG. 13.

In the following, the operation of self-timer shooting in the alternative embodiment of the image pickup apparatus 400 will be described with reference to the flowchart depicted in FIG. 14.

In the alternative embodiment, the photographer initially operates the image pickup apparatus 400 to select a self-timer shooting made (step S412), by which an operation signal 102 indicating the self-timer mode is fed to the system controller 14.

Then, in response to the operation signal 102 indicative of the selection of the self-timer shooting mode, the system controller 14 controls the subject distance detector 402 to measure the subject distance 404 from the apparatus 400 to the subject position.

The measured subject position 404 is fed back on the data bus 24 to the system controller 14, and the controller 14 in turn predictively calculate the traveling time for the photographer by using the subject position 404 obtained from the subject distance detector 402 and a predetermined moving speed, thereby determining the countdown period of time for self-timer shooting on the basis of the calculated traveling time (step S416).

The system controller 14 then activates the self-timer shooting mode (step S418) and thereafter starts a countdown for self-timer shooting in accordance with the countdown period of time defined in step S416 (step S420).

In addition, the system controller 14 operates as in the case of step S214 shown in FIG. 2 to determine whether or not the countdown is completed (step S422). If the countdown is completed, the operation proceeds to step S424; otherwise the operation returns to step S422 to continue the countdown.

In step S424, an automatic shooting is executed as with step S216 indicated in FIG. 2, and the operation then moves to step S426 in which a picked up image is stored in the recorder 28 in the same manner as step S218 shown in FIG. 2.

Figure 15:
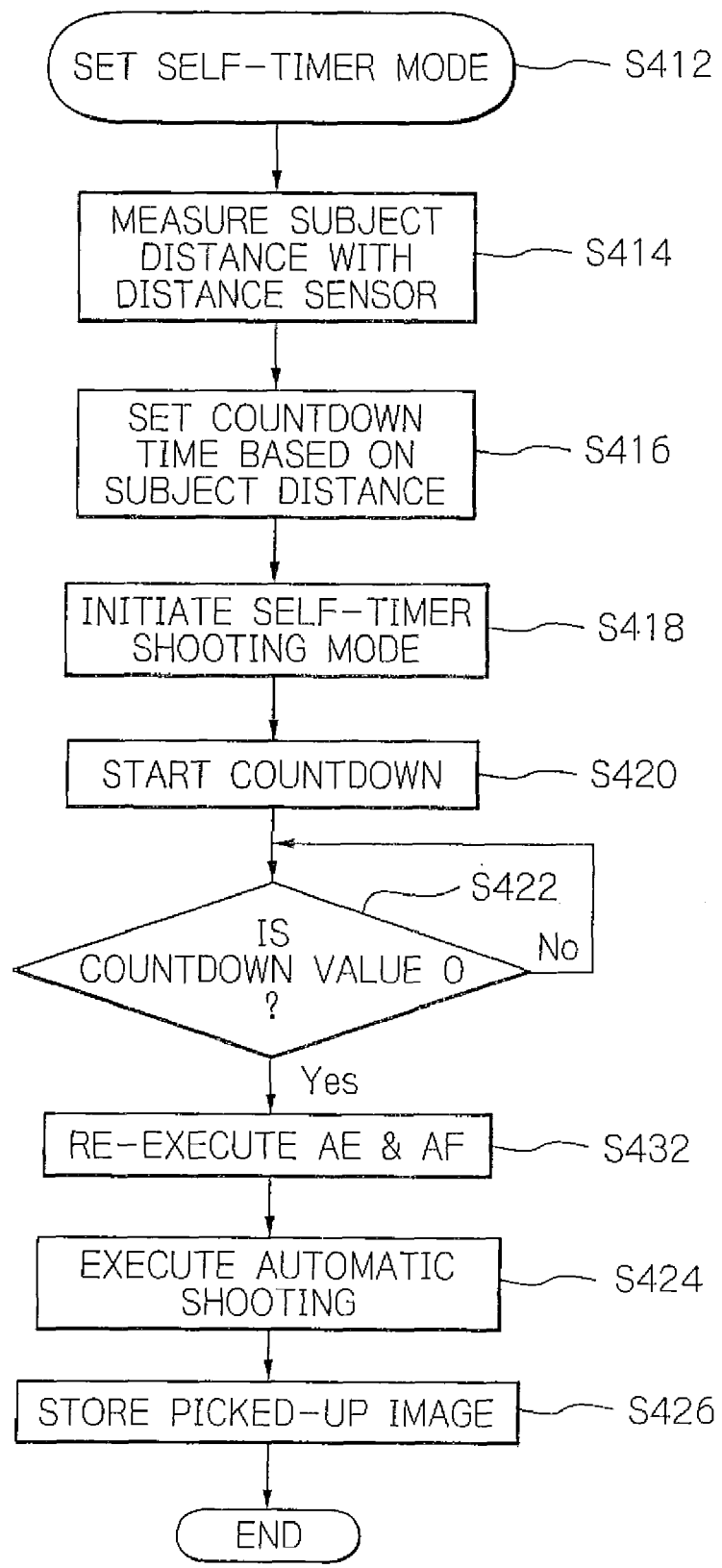
FIG. 15 is a flowchart useful for understanding the self-timer shooting operation where AE and AF adjustments are performed for the second time in the alternative embodiment shown in FIG. 13.

The image pickup apparatus 400 according to this embodiment may perform a self-timer shooting with effective AE and AF adjustments as shown in the flowchart illustrated in FIG. 15. With regard to FIG. 15, the descriptions about the operations in steps S412 to S426 that have made in respect to FIG. 14 will not be repeated.

In this instance, when it is determined in step S422 that the countdown for self-timer shooting is finished, the apparatus 400 performs AE and AF adjustments on the image of the shooting area for the second time (step S432) so that the precision of AE and AF adjustments can be improved.

Figure 16:
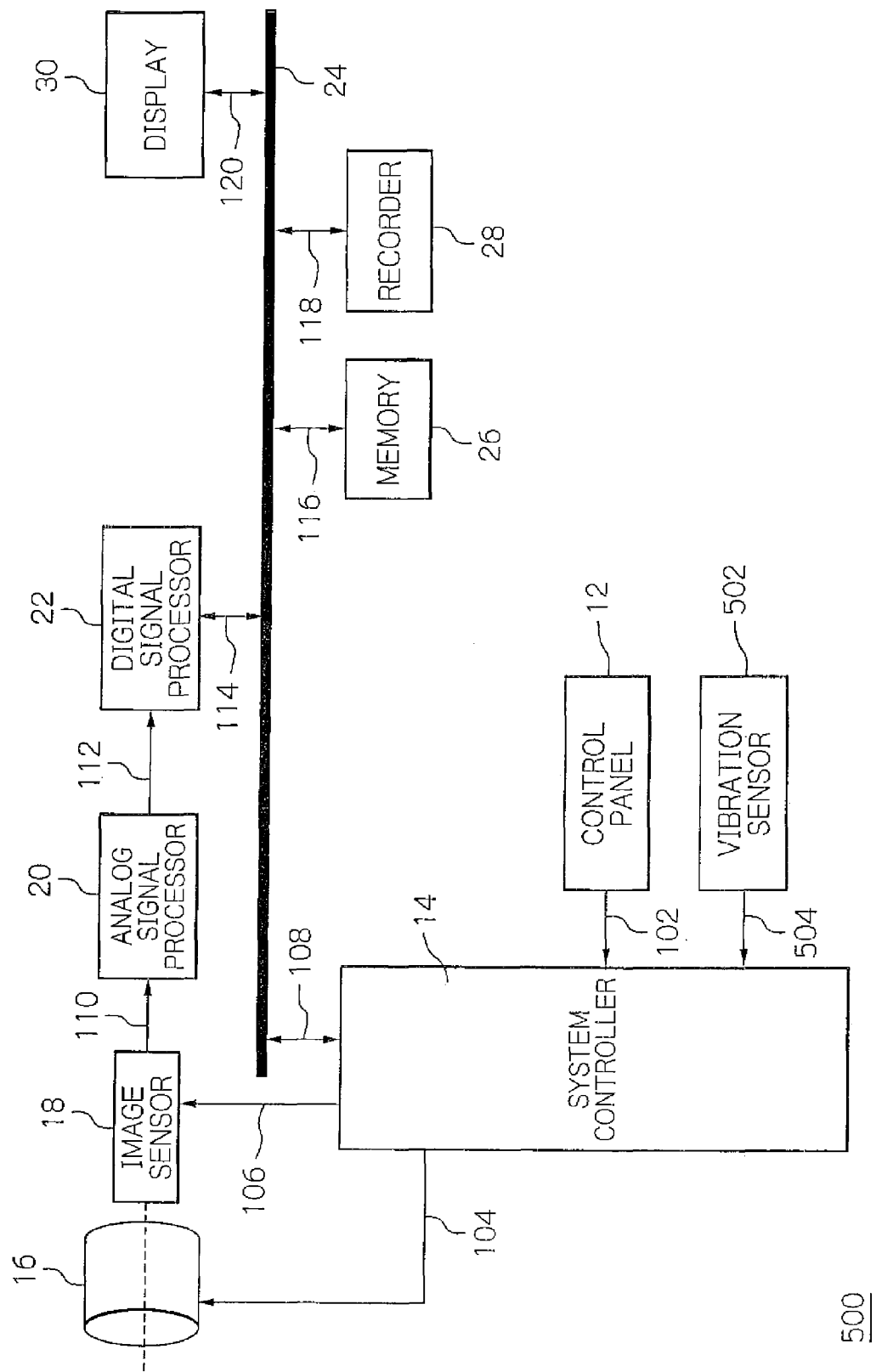
FIG. 16 is a schematic block diagram showing another alternative embodiment of the image pickup apparatus in accordance with the present invention.

In accordance with another alternative embodiment, as illustrated in FIG. 16, an image pickup apparatus 500 may be configured to comprise a vibration sensor 502 that that measures the amount of vibration of the apparatus 500 itself so that the automatic shooting can be cancelled forcedly depending on the measured vibration amount.

The image pickup apparatus 500 may be constituted without the face detector 32 and the face blur amount detector 34. A repetitive description will be omitted for some of the constituent elements of apparatus 500 that correspond to those of the image pickup apparatus 10 shown in FIG. 1.

To the vibration sensor 502, a vibration measurement device can be applied, such as an angular speed sensor or a gyro-sensor, in order to measure a shaking amount of the apparatus 500, i.e. a vibration amount 504 during image shooting to supply the measured amount to the system controller 14 over the data bus 24.

The system controller 14 of the alternative embodiment can control the vibration sensor 502 to measure the vibration amount of the apparatus 500 in the self-timer shooting mode, and determine, on the basis of the vibration amount 504 of the apparatus derived from the vibration sensor 502, whether or not a shift is involved in the angle-of-view of an image taken by the apparatus 500. The controller 14 compares the apparatus vibration amount 504 with a predetermined threshold value, so that, when the vibration amount exceeds the threshold value, the controller 14 then determines that the angle-of-view is shifted from that at the beginning of the self-timer shooting; otherwise determines that the photo shooting is ready to be carried on.

Now, the operation of self-timer shooting in the alternative embodiment of the image pickup apparatus 500 will be described with reference to the flowchart illustrated in FIG. 17.

In the alternative embodiment, the photographer initially operates the image pickup apparatus 500 to select the self-timer shooting mode, so that an operation signal 102 indicating the self-timer mode is fed to the system controller 14, whereby the self-timer shooting begins (step S512).

The system controller 14 then starts in step S514 a countdown for self-timer shooting from the reference countdown period of time as with step S212 depicted in FIG. 2.

Furthermore, the system controller 14 controls the vibration sensor 502 to commence the measurement of the vibration amount 504 in the apparatus 500 (step S516).

When the apparatus vibration amount 504 is measured, the resultant value is supplied to the system controller 14 to be compared with a predetermined threshold value (step S518). If the vibration amount 504 is greater than or equal to the threshold, the controller 14 can determine that a shift in an angle-of-view has occurred, so that the operation goes to step S520; otherwise determine that the displacement has not occurred, and thus the operation moves to step S522.

In step S520, the self-timer shooting in the apparatus 500 is canceled, the self-timer shooting mode is turned off by way of example, and the countdown is stopped.

While on the other hand, the process in step S522 is executed in the same manner as step S214 shown in FIG. 2 to determine whether or not the countdown is completed. When the countdown is not completed, the operation goes back to step S518 to continue the comparison of the vibration amount with the threshold value; and if completed, the operation proceeds to step S524 to execute the foregoing automatic shooting and then goes to step S526 in order to store the picked up image date in the recorder 28 as described above.

The entire disclosure of Japanese patent application No. 2007-247650 filed on Sep. 25, 2007, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An image pickup apparatus which includes an image sensor for receiving light incident from a subject field through an optics to form an image with a plurality of pixels and electrically converting the image to a corresponding signal charge to thereby generate an image signal, comprising:
    a face detector for extracting face data of a person in the subject field on a basis of the image signal in a self-timer shooting;
    a face examination section for comparing the extracted face data detected by said face detector with face data of a person registered beforehand, and using a comparison result to examine whether or not the registered person is detected;

a countdown section for executing, if said face examination section determines that the registered person is detected, countdown starting from a predetermined reference countdown period of time; and a shooting controller for controlling said image sensor to execute an automatic shooting when the countdown is completed by said countdown section, said apparatus further comprising:

a face blur amount detector for using the extracted face data detected in said face detector to detect a blur amount of a face image of the registered person; and a registered person readiness determining section for determining on a basis of the face blur amount detected by said face blur amount detector whether or not the registered person is in readiness in a shooting area, said registered person readiness determining section obtaining an updating time on the basis of a time that elapsed until the registered person becomes in readiness in a shooting area, thereby using the updating time to define a renewed countdown period of time so as to determine the renewed countdown period of time as the reference countdown period of time.

2. The apparatus in accordance with claim 1, wherein said apparatus performs automatic focus and auto exposure adjustments to the image of the subject field after said countdown section starts counting down.

3. The apparatus in accordance with claim 1, wherein when said face examination section cannot detect the registered person until a predetermined shooting cancellation time runs out after a start of the self-timer shooting, said apparatus cancels the self-timer shooting and informs a photographer of a cancellation of the shooting.

4. The apparatus in accordance with claim 1, wherein when said face examination section cannot detect the registered person until a predetermined forced shooting time runs out after a start of the self-timer shooting, said apparatus forcedly executes the automatic shooting by said shooting controller regardless of the countdown.

5. The apparatus in accordance with claim 1, wherein a said face blur amount detector for uses the extracted face data detected in said face detector to detect, when said face examination section determines that the registered person is detected, the blur amount of the face image of the registered person; and said registered person readiness determining section compares the face blur amount detected by said face blur amount detector with a predetermined threshold value to determine on a basis of a comparison result whether or not the registered person is in readiness in a shooting area, said registered person readiness determining section further determines the updating time by using, if the face blur amount becomes less than or equal to the threshold before an end of the countdown made by said countdown section, a time that elapsed until the blur amount becomes less than or equal to the threshold after the start of the countdown; and otherwise by adding the reference countdown period of time to a predetermined additional time, thereby using the updating time to define a renewed countdown period of time so as to determine the renewed countdown period of time as the reference countdown period of time.

6. The apparatus in accordance with claim 1, wherein said apparatus further measures, when said face examination section determines that the registered person is not detected after said face examination section once has determined that the registered person has been detected, an elapsed time from an undetecting point of the registered person, and then determines, when the elapsed time passes a predetermined permissible time of face-missing, that a face of the registered person is out of a frame of the image, thereby canceling the self-timer shooting.

7. The apparatus in accordance with claim 1, wherein said apparatus performs, after said countdown section completes the countdown, automatic focus and auto exposure adjustments to the image of the subject field.

8. In accordance with claim 1, wherein said apparatus further comprises:

an apparatus vibration amount sensor for detecting an apparatus vibration amount of said apparatus; and an angle-of-view shift determining section for comparing the apparatus vibration amount with a predetermined threshold value, and determining, in response to a comparison result, a shift in an angle-of-view occurring in a course of the self-timer shooting, said angle-of-view shift determining section canceling the self-timer shooting if the apparatus vibration amount exceeds the threshold.

9. The apparatus in accordance with claim 1, wherein said registered person readiness determining section averages the updating time and the reference countdown period of time so as to decide the resultant average as a renewed reference countdown period of time.

10. An automatic shooting method using an image pickup apparatus which has an image sensor for receiving light incident from a subject field through an optics to form an image with a plurality of pixels and electrically converting the image to a corresponding signal charge to thereby generate an image signal, comprising:

a face detection step of extracting face data of a person in the subject field on a basis of the image signal in a self-timer shooting;

a face examination step of comparing the extracted face data detected in said face detection step with face data of a person registered beforehand, and using a comparison result to examine whether or not the registered person is detected;

a countdown step of executing, if the registered person is determined as being detected in said face examination step, countdown starting from a predetermined reference countdown period of time; and an automatic shooting step of controlling the image sensor to execute an automatic shooting when the countdown is completed in said countdown step, said method further comprising:

a face blur amount detection step of using the extracted face data detected in said face detection step to detect a blur amount of a face image of the registered person; and a registered person readiness determination step of determining on the basis of the face blur amount detected in said face blur amount detection step whether or not the registered person is in readiness in a shooting area, said registered person readiness determination step obtaining an updating time on the basis of a time that elapsed until the registered person becomes in readiness in a shooting area, thereby using the updating time to define a renewed countdown period of time to determine the renewed countdown period of time as the reference countdown period of time.

11. The method in accordance with claim 10, wherein said method performs automatic focus and auto exposure adjustments to the image of the subject field after the countdown is started in said countdown step.

12. The method in accordance with claim 10, wherein when the registered person is detected in said face examination step until a predetermined shooting cancellation time elapses after the start of the self-timer shooting, said method cancels the self-timer shooting and informs a photographer of a cancellation of the shooting.

13. The method in accordance with claim 10, wherein when the registered person is not detected in said face examination step until a predetermined forced shooting time elapses after a start of the self-timer shooting, said method forcedly executes the automatic shooting by said automatic shooting step regardless of the countdown.

14. The method in accordance with claim 10, wherein
said face blur amount detection step uses the extracted face data detected in said face detection step to detect, when the registered person is determined as being detected in said face examination step, the blur amount of the face image of the registered person; and
said registered person readiness determination step of compares the face blur amount detected in said face blur amount detection step with a predetermined threshold value to determine on a basis of the comparison result whether or not the registered person is in readiness in a shooting area,
said registered person readiness determination step further determines the updating time by using, if the face blur amount becomes less than or equal to the threshold before an end of the countdown in said countdown step, a time that elapsed until the blur amount becomes less than or equal to the threshold after the start of the countdown; and otherwise by adding a time period consisting of the reference countdown period of time to a predetermined additional time, thereby using the updating time to define a renewed countdown period of time to determine the renewed countdown period of time as the reference countdown period of time.

15. The method in accordance with claim 11, wherein
when the registered person is determined as being undetectable in said face examination step after the registered person once has been determined as being detected in said face examination step, said method measures an elapsed time from an undetecting point of the registered person, and then determines, when the elapsed time exceeds a predetermined permissible time of face-missing, that a face of the registered person is out of a frame of image, thereby canceling the self-timer shooting.

16. The method in accordance with claim 10, wherein said method performs automatic focus and auto exposure adjustments to the image of the subject field after the countdown is completed in said countdown step.

17. The method in accordance with claim 11, wherein
said method further comprises:
an apparatus vibration amount detection step of detecting an apparatus vibration amount of the image pickup apparatus; and
an angle-of-view shift determination step of comparing the apparatus vibration amount with a predetermined threshold value, and determining, in response to a comparison result, a shift in an angle-of-view occurring in a course of the self-timer shooting,
said angle-of-view shift determination step canceling the self-timer shooting if the apparatus vibration amount exceeds the threshold value.

18. The method in accordance with claim 10, wherein said registered person readiness determining step averages the updating time and the reference countdown period of time so as to decide the resultant average as a renewed reference countdown period of time.

* * * * *